US011945271B2

(12) United States Patent
Zhou et al.

(10) Patent No.: US 11,945,271 B2
(45) Date of Patent: Apr. 2, 2024

(54) RIGID-FLEXIBLE COUPLING MULTI-DEGREE-OF-FREEDOM WALKING POSITION-ADJUSTING LEG UNIT AND HYBRID ROBOT PLATFORM THEREOF

(71) Applicant: Yanshan University, Qinhuangdao (CN)

(72) Inventors: Yulin Zhou, Qinhuangdao (CN); Shuyang Shi, Qinhuangdao (CN); Lihui Zhao, Qinhuangdao (CN); Xuesong Qiu, Qinhuangdao (CN); Zongqiang Feng, Qinhuangdao (CN); Yi Liu, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 406 days.

(21) Appl. No.: 17/409,873

(22) Filed: Aug. 24, 2021

(65) Prior Publication Data
US 2021/0379952 A1 Dec. 9, 2021

Related U.S. Application Data

(63) Continuation of application No. PCT/CN2020/105433, filed on Jul. 29, 2020.

(30) Foreign Application Priority Data

Dec. 6, 2019 (CN) .......................... 201911243309.2

(51) Int. Cl.
*B60G 17/015* (2006.01)
*B60G 11/14* (2006.01)
*B62D 63/04* (2006.01)

(52) U.S. Cl.
CPC .......... *B60G 17/0157* (2013.01); *B60G 11/14* (2013.01); *B62D 63/04* (2013.01); *B60G 2202/12* (2013.01)

(58) Field of Classification Search
CPC ...... B60G 17/0157; B60G 1/14; B60G 17/00; B60G 11/14; B66F 9/063; B66F 9/07586
See application file for complete search history.

(56) References Cited

U.S. PATENT DOCUMENTS

| 4,496,274 A | * | 1/1985 | Pipes | ...................... B66F 9/063 180/68.5 |
| 4,750,579 A | * | 6/1988 | Jarl | ...................... B66F 9/07586 180/209 |

(Continued)

FOREIGN PATENT DOCUMENTS

| CA | 2331100 C | * | 8/2007 | ........... G05D 1/0272 |
| CN | 106515903 A | | 3/2017 | |

(Continued)

Primary Examiner — Frank B Vanaman
(74) Attorney, Agent, or Firm — IPRO, PLLC

(57) ABSTRACT

A rigid-flexible coupling multi-degree-of-freedom walking position-adjusting leg unit and a hybrid robot platform thereof is provided and includes a vertical rigid-flexible coupling multi-degree-of-freedom walking position-adjusting leg unit and a horizontal rigid-flexible coupling multi-degree-of-freedom walking position-adjusting leg unit, which both include a moving device, a moving drive, a steering frame, a lifting frame, a spring device and a driving differential wheel set, in combination with a frame, a driver set, a battery pack and a control box, forming a multi-degree-of-freedom parallel mechanism platform. The hybrid robot platform including the rigid-flexible coupling multi-degree-of-freedom walking position-adjusting leg unit as provided by the present disclosure has functions of a rigid position adjustment, an elastic suspension and a rigid-flexible coupling position adjustment, and can automatically adapt to a working condition of the uneven ground.

8 Claims, 12 Drawing Sheets

(56) References Cited

U.S. PATENT DOCUMENTS

| | | | | |
|---|---|---|---|---|
| 5,036,941 | A | * 8/1991 | Denzin | B60G 11/14 |
| | | | | 180/252 |
| 5,535,843 | A | * 7/1996 | Takeda | B25J 5/007 |
| | | | | 180/200 |
| 6,491,127 | B1 | * 12/2002 | Holmberg | B62D 7/026 |
| | | | | 301/6.5 |
| 11,124,034 | B2 | * 9/2021 | Koo | B66F 9/07568 |
| 2012/0111648 | A1 | * 5/2012 | Terashima | B60K 7/0007 |
| | | | | 301/6.5 |
| 2021/0323621 | A1 | * 10/2021 | Zhou | B60K 1/00 |

FOREIGN PATENT DOCUMENTS

| | | | | |
|---|---|---|---|---|
| CN | 110469758 A | | 11/2019 | |
| CN | 110481673 A | | 11/2019 | |
| CN | 110509739 A | | 11/2019 | |
| CN | 111071371 A | | 4/2020 | |
| GB | 2276854 A | * | 10/1994 | B60K 17/14 |
| JP | 2003299601 A | * | 10/2003 | A47L 9/28 |

\* cited by examiner

RIGID-FLEXIBLE COUPLING MULTI-DEGREE-OF-FREEDOM WALKING POSITION-ADJUSTING LEG UNIT AND HYBRID ROBOT PLATFORM THEREOF

TECHNICAL FIELD

This disclosure relates to the technical field of an universal equipment butt joint and assembly auxiliary equipment, in particular to a vertical rigid-flexible coupling multi-degree-of-freedom walking position-adjusting leg unit and a vertical global multi-degree-of-freedom moving position-adjusting hybrid robot platform thereof, and also relates to a horizontal rigid-flexible coupling multi-degree-of-freedom walking position-adjusting leg unit and a horizontal global multi-degree-of-freedom moving position-adjusting hybrid robot platform thereof.

BACKGROUND

In the field of equipment manufacturing such as ships, airplanes and electric power, products are generally assembled by a plurality of parts, and the parts have large volumes and masses and cannot be directly operated manually, so that auxiliary position adjustment and assembly are required by means of a moving position-adjusting platform. At present, the moving position-adjusting platform includes a wheel type carrier and a Michel wheel carrier, and these two kinds of carriers generally have three degrees of freedom such as moving on a plane and rotating around a normal line of a carrying platform, so that the adjustment of six degrees of freedom of a part space cannot be realized, resulting in that the parts cannot be butted in the butting process. To solve this problem, those skilled in the art take a carrier and the parallel mechanism into combination, for example, a six-degree-of-freedom position-adjusting system based on an omnidirectional moving module disclosed in Chinese patent (CN109231065A), in which a multi-degree-of-freedom parallel position-adjusting mechanism is mounted on the carrier, in order to realize a spatial six-degree-of-freedom position adjustment of the carrier.

The position-adjusting system consisting of the carrier and the parallel mechanism still belongs to two independent systems essentially, and motion errors generated by the carrier and the parallel mechanism in the working process are mutually accumulated, to reduce the motion precision at the bottom end of the moving position-adjusting platform, and thus not facilitate for the high-precision butt joint and assembly of the parts; and the parallel mechanism is mounted on the vehicle body, so that a height of the whole position-adjusting vehicle body is greatly increased, thereby reducing the trafficability of the vehicle body, and the equipment assembly and butt joint in some low spaces cannot be completed. That is, integration, flexibility and intelligence of movement and position adjustment are lower. In addition, the combined position-adjusting system cannot realize positioning of a mass and a mass center of the carried object during the position adjustment, therefore the position-adjusting system cannot meet the requirement under the working condition that the mass center positioning is required.

SUMMARY

In order to solve the above problems, the present disclosure provides a rigid-flexible coupling multi-degree-of-freedom walking position-adjusting leg unit and a global multi-degree-of-freedom mobile position-adjusting hybrid robot platform. A rigid-flexible coupling multi-degree-of-freedom walking position-adjusting leg unit is divided into a vertical rigid-flexible coupling multi-degree-of-freedom walking position-adjusting leg unit and a horizontal rigid-flexible coupling multi-degree-of-freedom walking position-adjusting leg unit.

A technical solution employed by the present disclosure to solve the above-mentioned technical problem is that a vertical rigid-flexible coupling multi-degree-of-freedom walking position-adjusting leg unit, includes a first moving device, a first lifting frame, a first moving drive, a first moving mechanism, a first steering drive, a steering frame, a first spring device and a first driving differential wheel set. Two sets of first moving devices are symmetrically arranged on two sides of the first lifting frame by second sliding blocks; the first moving drive is fixed in a middle of the steering frame by a first motor mounting frame; first sliding blocks and first nuts of the first moving mechanisms in set are mounted on an inner side of the first lifting frame, and two sets of the first moving mechanisms are respectively fixedly connected to two sides of the steering frame with a height difference; four sets of the first spring devices are symmetrically and fixedly connected to four corners on a bottom of an outer side of the first steering frame by spring fixing frames; and spring pressing blocks of the first spring devices are symmetrically and fixedly connected to the four corners of an inside of the first lifting frame; the first steering drive is fixedly connected to an inner side of the steering frame by a first steering motor mounting frame; a steering driven synchronous wheel of the first steering drive is fixedly connected to a top end of a vertical shaft of a first driving differential wheel set that is rotatably mounted at a center on the bottom of the steering frame by a vertical shaft. The first moving device includes a first vehicle body adapter, a second guide rail, a second sliding block, a second lead screw supporting seat, a second lead screw, a second nut, a second lead screw fixing seat, a second servo motor and a second speed reducer, in which the second guide rail is respectively and fixedly connected to two sides of the first vehicle body adapter; the second sliding block and the second guide rail form a moving pair Pz2; two ends of the second lead screw are supported by the second lead screw fixing seat and the second lead screw supporting seat respectively, an axis of which is parallel to the second guide rail; the second nut and the second lead screw form a screw pair, and the second servo motor is connected with the second lead screw by a second speed reducer. The first moving drive includes a first servo motor, a worm gear speed reducer, a first clutch, a first speed reducer, a first synchronous shaft, a first high-level driving synchronous wheel, a first low-level driving synchronous wheel, a first motor mounting frame and a first synchronous belt, in which the first servo motor is connected with a left end of the first clutch by the worm gear speed reducer, and a right end of the first clutch is fixedly connected to the first speed reducer; the first speed reducer is fixedly connected to a steering frame by a first motor mounting frame; the first synchronous shaft is rotatably mounted on the first motor mounting frame; the first high-level driving synchronous wheel and the first low-level driving synchronous wheel are respectively connected with the first synchronous shaft; and an output shaft of the first speed reducer is in key connection with the first synchronous shaft. The first moving mechanism includes a first driven synchronous wheel, a first lead screw fixing seat, a first lead screw, a first nut, a first lead screw supporting seat, a first guide rail and a first sliding block, in which the first guide rail is fixedly connected to the first steering frame; the first sliding block and the first guide rail form a moving pair Pz1; two ends of the first lead screw are respectively supported by the first lead screw fixing seat and the first lead screw supporting seat, the axis of which is parallel to the first guide rail; the first nut and the first lead screw form a screw pair; the first driven synchronous wheel is fixedly connected to an input end of the first lead screw, and the first driven synchronous wheel is synchronously meshed and connected with the first high-level driving synchronous wheel and the first low-level driving synchronous wheel through the first synchronous belt. The first steering drive includes a first steering motor, a first steering speed reducer, a first steering motor mounting frame, a steering driving synchronous wheel, a steering synchronous belt and a steering driven synchronous wheel, in which the first steering motor mounting frame is fixedly connected to the inner side of the first steering frame; the first steering motor is connected with the steering driving synchronous wheel through the first steering speed reducer; the steering driving synchronous wheel is connected with the steering driven synchronous wheel through the steering synchronous belt; the steering driven synchronous wheel is fixedly connected with the vertical shaft; and the vertical shaft is connected with the first steering frame to form a rotating pair Rz. The first driving differential wheel set includes a wheel-rotation motor mounting frame, a vertical shaft, a cross shaft, a left wheel, a right wheel, a wheel-rotation driven synchronous wheel, a wheel-rotation synchronous belt, a wheel-rotation driving synchronous wheel, a wheel-rotation speed reducer, a wheel-rotation motor and an angle encoder, in which a transverse shaft of the cross shaft is rotatably connected with a bottom of the vertical shaft to form a rotating pair Rx; a side of the vertical shaft is provided with the angle encoder; the left wheel and the right wheel are respectively connected with a left end and a right end of a longitudinal shaft of the cross shaft to form a rotating pair Ry1 and a rotating pair Ry2; two wheels are in contact with the ground to form a wheel-rotation pair Rp; the wheel-rotation motor is fixedly connected to the wheel-rotation speed reducer; the wheel-rotation speed reducer is fixedly connected above the cross shaft through the wheel-rotation motor mounting frame; the wheel-rotation driving synchronous wheel is fixedly connected to an output shaft of the wheel-rotation speed reducer; the wheel-rotation driven synchronous wheel is fixedly connected to outer sides of the left wheel and the right wheel; and the wheel-rotation driving synchronous wheel is connected with the wheel-rotation driven synchronous wheel through the wheel-rotation synchronous belt. The first spring device includes a spring fixing frame, a spring, a spring sliding barrel, a magnetic scale, a magnetic head, a spring pressing block and a spring guide pin, in which the spring guide pin is fixedly connected with the spring fixing frame; the spring and the spring sliding barrel are slidably mounted on the spring guide pin; the spring is mounted between the spring fixing frame and the spring sliding barrel; the spring fixing frame is provided with an upper limiting block; the magnetic head is fixedly connected to the spring sliding barrel; the magnetic scale is fixedly connected to a side of the spring fixing frame, and a direction of which is consistent with a moving direction of the magnetic head.

An axis of the moving pair Pz2 is parallel to an axis of the moving pair Pz1, an axis of the rotating pair Rz and an axis of the first spring device; an axis of the rotating pair Rx is perpendicular to an axis of the rotating pair Rz, an axis of the rotating pair Ry1 and an axis of the rotating pair Ry2; the axis of the rotating pair Ry1 is coincident with the axis of the rotating pair Ry2; and the moving pair Pz1 is connected in parallel with the first spring device, and the moving pair Pz2 is connected in series with the first spring device.

The first lead screw is a ball lead screw without a self-locking function, and the second lead screw is a sliding lead screw with a self-locking function.

A hybrid robot platform comprising the vertical rigid-flexible coupling multi-degree-of-freedom walking position-adjusting leg units, comprising a frame, a driver set, a battery pack and a control box, wherein the vertical rigid-flexible coupling multi-degree-of-freedom walking position-adjusting leg unit is symmetrically distributed at an edge of the frame and is connected through a first vehicle body adapter, in order to form a parallel mechanism platform, and the parallel mechanism platform is capable of including three, four, six or eight vertical rigid-flexible coupling multi-degree-of-freedom walking position-adjusting leg units. The axes of the rotating pairs Rz of the vertical rigid-flexible coupling multi-degree-of-freedom walking position-adjusting leg units are parallel to one another and perpendicular to a plane of the frame; and the driver set, the battery pack and the control box are fixed inside the frame.

A horizontal rigid-flexible coupling multi-degree-of-freedom walking position-adjusting leg unit comprises a steering device, a second moving device, a third moving drive, a second moving mechanism, a second steering frame, a second driving differential wheel set, a second lifting frame and a second spring device, wherein two sets of the second moving devices are connected with a gear turntable bearing in the steering device through a turntable adapter; and the third moving drive is fixedly connected to a middle of the second steering frame through a third motor mounting frame; a third guide rail in the second moving mechanism is connected with a second steering frame; a third sliding block in the second moving mechanism is connected with an inner side surface of the second lifting frame, and the two sets of the second moving mechanisms are provided with a height difference; the second driving differential wheel set is connected with a bottom of the second steering frame through a second vertical shaft; four sets of the second spring devices are symmetrically and fixedly connected to the middle of an inner side of the second steering frame through the second spring fixing frames, and the four sets of the second spring devices are symmetrically and fixedly connected to the inner side of the second lifting frame through the second spring pressing blocks;

the steering device comprises a second vehicle body adapter, a second steering motor mounting frame, a second steering speed reducer, a second steering motor, a pinion and a gear turntable bearing, in which an upper surface of an inner ring of the gear turntable bearing is connected with the second vehicle body adapter; the second steering motor is connected with the pinion through the second steering speed reducer, and the pinion is externally engaged with the gear turntable bearing to form a rotating pair Rz;

the second moving device comprises a turntable adapter, a fourth sliding block, a fourth guide rail, a fourth servo motor, a fourth speed reducer, a fourth lead screw fixing seat, a fourth lead screw, a fourth nut and a fourth lead screw supporting seat, in which the fourth sliding block and the fourth guide rail form a moving pair Pz2; the fourth guide rail is fixed inside the turntable adapter; the fourth lead screw is supported by the fourth lead screw fixing seat and the fourth lead screw supporting seat, and an axis of which is parallel to the fourth guide rail; the fourth servo motor is connected with the fourth lead screw through a fourth speed reducer, and the fourth lead screw is in spiral connection with a fourth nut;

the third moving drive comprises a third servo motor, a third worm speed reducer, a third clutch, a third motor mounting frame, a third low-level driving synchronous wheel, a third high-level driving synchronous wheel, a third synchronous shaft and a third synchronous belt, in which the third servo motor is connected with the third synchronous shaft through the third worm speed reducer and the third clutch; the third clutch is fixedly connected to the middle of the second steering frame through the third motor mounting frame; the third synchronous shaft is rotatably connected with the third motor mounting frame; and the third high-level driving synchronous wheel and the third low-level driving synchronous wheel are respectively and fixedly connected to a high level and a low level of the third synchronous shaft;

the second moving mechanism comprises a third sliding block, a third guide rail, a third lead screw supporting seat, a third nut, a third lead screw fixing seat and a third driven synchronous wheel, in which the third guide rail is parallel to and fixedly connected to the second steering frame; the third sliding block and the third guide rail form a moving pair Pz1; the third lead screw is supported by the third lead screw fixing seat and the third lead screw supporting seat, and an axis of which is parallel to the third guide rail; the third driven synchronous wheel is fixedly connected to an input end of the third lead screw; and the third lead screw is in spiral connection with the third nut;

the third low-level driving synchronous wheel is connected with a third driven synchronous wheel on the lower side through a third synchronous belt; and the third high-level driving synchronous wheel is connected with a third driven synchronous wheel on the upper side through a third synchronous belt;

the second driving differential wheel set comprises a second wheel-rotation motor mounting frame, a second vertical shaft, a second crossed shaft, a second left wheel, a second right wheel, a second wheel-rotation driven synchronous wheel, a second wheel-rotation synchronous belt, a second wheel-rotation driving synchronous wheel, a second wheel-rotation speed reducer, a second wheel-rotation motor and a second angle encoder, in which a transverse shaft of the second crossed shaft is rotatably connected with a bottom of the second vertical shaft to form a rotating pair Rx, and an end face of the transverse shaft is provided with the second angle encoder; the second left wheel and the second right wheel are respectively and rotatably mounted at a left end and a right end of a longitudinal axis of the second cross shaft to form a rotating pair Ry1 and a rotating pair Ry2; and two wheels are in contact with the ground to form a wheel-rotation pair Rp; the second wheel-rotation driven synchronous wheel is fixedly connected to outer sides of a second left wheel and a second right wheel respectively; the second wheel-rotation driven synchronous wheel is connected with the second wheel-rotation driving synchronous wheel through the second wheel-rotation synchronous belt; and the second wheel-rotation driving synchronous wheel is connected with a second wheel-rotation motor through the second wheel-rotation speed reducer;

the second spring device comprises a second spring fixing frame, a second spring sliding barrel, a second magnetic scale, a second magnetic head, a second spring pressing block and a second spring guide pin, in which a top of the second spring guide pin is connected with the second spring fixing frame, and the second spring fixing frame is provided with an upper limiting block; the second spring and the second spring sliding barrel are slidably mounted on the second spring guide pin, and the second spring is mounted between the second spring fixing frame and the second spring sliding barrel; the second magnetic head is fixedly connected to the second spring sliding barrel; the second magnetic scale is fixedly connected to a side of the second spring fixing frame, and a direction of which is consistent with a moving direction of the second magnetic head.

An axis of the rotating pair Rz, an axis of the moving pair Pz2, an axis of the moving pair Pz1 and an axis of the second spring device are parallel to one another; an axis of the rotating pair Rx is perpendicular to the axis of the rotating pair Rz, and also is perpendicular to an axis of the rotating pair Ry1 and an axis of the rotating pair Ry2; and the axis of the rotating pair Ry1 is coincident with the axis of the rotating pair Ry2.

The fourth lead screw is a sliding lead screw with a self-locking function, and the third lead screw is a ball lead screw without a self-locking function.

A hybrid robot platform with the horizontal rigid-flexible coupling multi-degree-of-freedom walking position-adjusting leg units, comprising a frame, a driver set, a battery pack and a control box, wherein the horizontal rigid-flexible coupling multi-degree-of-freedom walking position-adjusting leg unit is symmetrically distributed at an edge of the frame and is connected through a second vehicle body adapter, in order to form a parallel mechanism platform, and the parallel mechanism platform is capable of including three, four, six or eight horizontal rigid-flexible coupling multi-degree-of-freedom walking position-adjusting leg units. The axes of the rotating pairs Rz of the horizontal rigid-flexible coupling multi-degree-of-freedom walking position-adjusting leg units are parallel to one another and perpendicular to a plane of the frame; and the driver set, the battery pack and the control box are fixed inside the frame.

Compared with the prior art, the present disclosure has the following advantages:

(1) The vertical and horizontal rigid-flexible coupling multi-degree-of-freedom walking position-adjusting leg units have rigid position adjustment, elastic suspension and rigid-flexible coupling position adjustment functions. The first steering motor of the vertical rigid-flexible coupling multi-degree-of-freedom walking position-adjusting leg unit and the second steering motor of the horizontal rigid-flexible coupling multi-degree-of-freedom walking position-adjusting leg unit form a redundant drive corresponding to the steering motion generated by asynchronous motion of the rotating pair Rz and two driving differential wheels, to ensure a high precision of the position-adjusting leg units during steering. Based on vertical or horizontal rigid-flexible coupling multi-degree-of-freedom walking position-adjusting leg unit, a parallel mechanism robot platform with multi-branch legs and multi-degree-of-freedom global movement and position adjustment at any spatial position is constructed, and may be an overall parallel mechanism with three, four, six and eight legs.

(2) The legs of the vehicle body are designed by introducing an open ground as a fixed platform and considering pure rolling motion between the wheels and the ground, so that the position-adjusting leg unit has a function of adjusting the position of the vehicle body besides the conventional walking function, and further organically integrates an omnidirectional movement and the position adjustment of the vehicle body. The six-freedom-degree position-adjusting function is realized, the motion precision of the moving position-adjusting platform can be improved, the overall height of the moving position-adjusting platform is effectively reduced, so that the six-freedom-degree position-adjusting butt joint and assembly can be realized in some low space environments (3) For the vertical and horizontal rigid-flexible coupling multi-degree-of-freedom walking position-adjusting leg units, a moving pair Pz1 and a spring are in parallel connection, a weight of the whole vehicle is transferred to the spring through a first moving device and a first lifting frame by adjusting the position of the moving pair Pz1, and the spring is compressed and connected with a load; the first clutch is disengaged, the first lead screw is not self-locked and can be followed, and the whole vehicle is elastically suspended, this characteristic can be allowed to automatically adapt to the working condition of uneven ground in a walking process; a compression amount and a force in the vertical direction of each leg are detected through the magnetic scale at the moving end of the spring, so as to detect the weight and the position coordinate of the mass center of the vehicle-carried object are detected in real time. On the basis, the position of the moving pair Pz2 is dynamically adjusted by utilizing a series mechanism of the moving pair Pz2 and a spring, so that the vehicle body can be maintained at a certain state to travel on a high-low complex ground, and the rigid-flexible coupling position adjustment can be realized.

Figure 1:
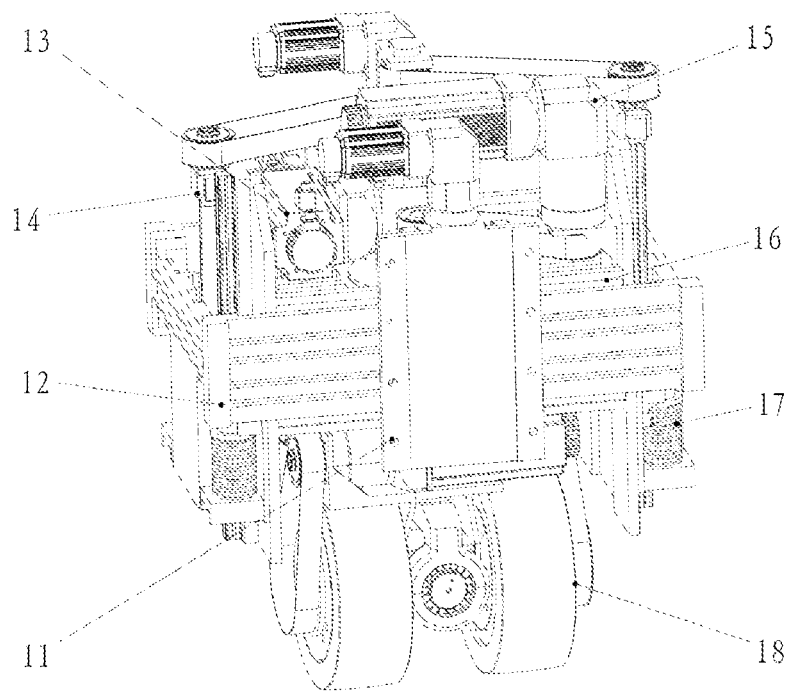
FIG. 1 is a schematic structural view of a vertical rigid-flexible coupling multi-degree-of-freedom walking position-adjusting leg unit.

Reference numbers are listed as follows:

1. vertical rigid-flexible coupling multi-degree-of-freedom walking position-adjusting leg unit; 2. horizontal rigid-flexible coupling multi-degree-of-freedom walking position-adjusting leg unit; 3. frame; 4. driver set; 5. battery pack; 6. control box; 1a. first position-adjusting leg unit; 1b. second position-adjusting leg unit; 1c. third position-adjusting leg unit; 1d. fourth position-adjusting leg unit; 2a. fifth position-adjusting leg unit; 2b. sixth position-adjusting leg unit; 2c. seventh position-adjusting leg unit; 2d. eighth position-adjusting leg unit; 11. first moving device; 12. first lifting frame; 13. first moving drive; 14. first moving mechanism; 15. first steering drive; 16. steering frame; 17. first spring device; 18. first driving differential wheel set; 21. steering device; 22. second moving device; 23. third moving drive; 24. second moving mechanism; 25. second steering frame; 26. second driving differential wheel set; 27. second lifting frame; 28. second spring device; 111. first vehicle body adapter; 112. second guide rail; 113. second sliding block; 114. second lead screw supporting seat; 115. second lead screw; 116. second nut; 117. second lead screw fixing seat; 118. second servo motor; 119. second speed reducer; 131. first servo motor; 132. worm gear speed reducer; 133. first clutch; 134. first speed reducer; 135. first synchronous shaft; 136. first high-level driving synchronous wheel; 137. first low-level driving synchronous wheel; 138. first motor mounting frame; 139. first synchronous belt; 141. first driven synchronous wheel; 142. first lead screw fixing seat; 143. first lead screw; 144. first nut;

145. first lead screw supporting seat; 146. first guide rail; 147. first sliding block; 151. first steering motor; 152. first steering speed reducer; 153. first steering motor mounting frame; 154. steering driving synchronous wheel; 155. steering synchronous belt; 156. steering driven synchronous wheel; 171. spring fixing frame; 172. spring; 173. spring sliding barrel; 174. magnetic scale; 175. magnetic head; 176. spring pressing block; 177. spring guide pin; 180. wheel-rotation motor mounting frame; 181. vertical shaft; 182. cross shaft; 183. left wheel; 184. right wheel; 185. wheel-rotation driven synchronous wheel; 186. wheel-rotation synchronous belt; 187. wheel-rotation driving synchronous wheel; 188. wheel-rotation speed reducer; 189. wheel-rotation motor; 190. angle encoder; 211. second vehicle body adapter; 212. second steering motor mounting frame; 213. second steering speed reducer; 214. second steering motor; 215. pinion; 216. gear turntable bearing; 221. turntable adapter; 222. fourth sliding block; 223. fourth guide rail; 224. fourth servo motor; 225. fourth speed reducer; 226. fourth lead screw fixing seat; 227. fourth lead screw; 228. fourth nut; 229. fourth lead screw supporting seat; 231. third servo motor; 232. third worm speed reducer; 233. third clutch; 234. third motor mounting frame; 235. third low-level driving synchronous wheel; 236. third high-level driving synchronous wheel; 237. third synchronous shaft; 238. third synchronous belt; 241. third sliding block; 242. third guide rail; 243. third lead screw supporting seat; 244. third nut; 245. third lead screw; 246. third lead screw fixing seat; 247. third driven synchronous wheel; 260. second wheel-rotation motor mounting frame; 261. second vertical shaft; 262. second cross shaft; 263. second left wheel; 264. second right wheel; 265. second wheel-rotation driven synchronous wheel; 266. second wheel-rotation synchronous belt; 267. second wheel-rotation driving synchronous wheel; 268. second wheel speed reducer; 269. second wheel-rotation motor; 281. second spring fixing frame; 282. second spring; 283. second spring sliding barrel; 284. second magnetic scale; 285. second magnetic head; 286. second spring pressing block; 287. second spring guide pin; 290. second angle encoder.

DETAILED DESCRIPTION

Hereinafter, the technical solutions in the embodiments of the present disclosure will be clearly and completely described in combination with the accompanying drawings. Other embodiments obtained by the person skilled in the art without any creative effort are within the scope of the present disclosure.

A rigid-flexible coupling multi-degree-of-freedom walking position-adjusting leg unit and a hybrid robot platform thereof in the present disclosure will be described in detail with reference to accompanying drawings.

Figure 2:
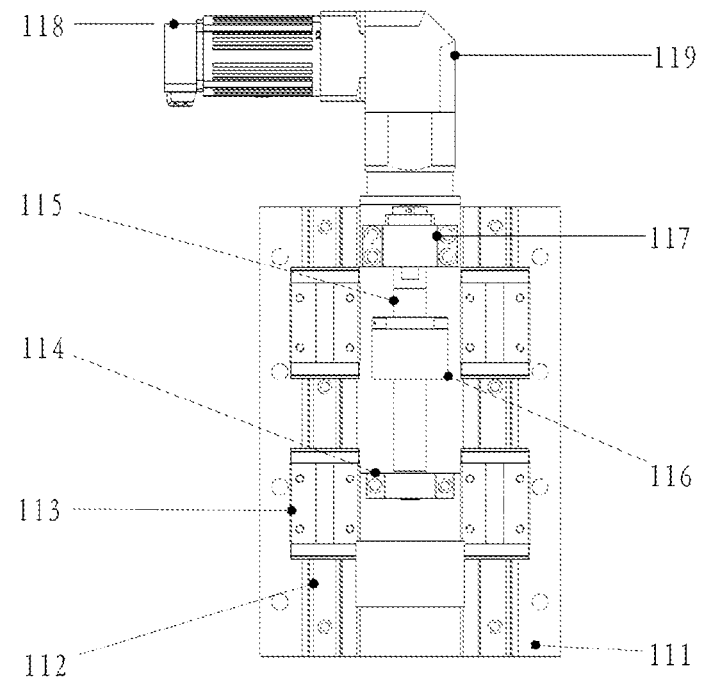
FIG. 2 is a schematic structural view of a first moving device of the vertical rigid-flexible coupling multi-degree-of-freedom walking position-adjusting leg unit.
Figure 3:
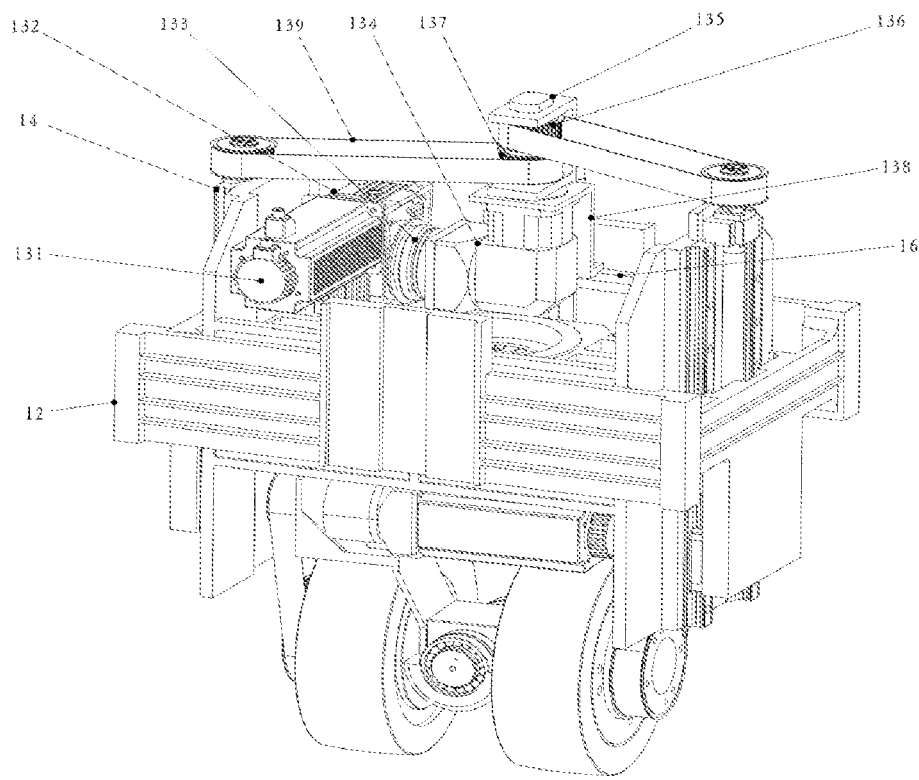
FIG. 3 is a schematic structural view of a first moving drive of the vertical rigid-flexible coupling multi-degree-of-freedom walking position-adjusting leg unit.
Figure 4:
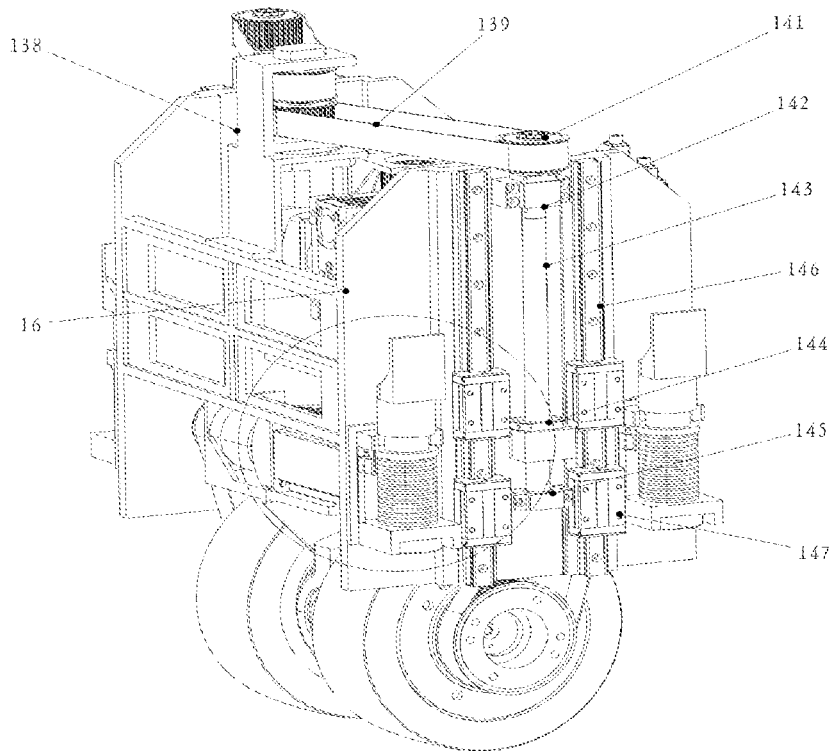
FIG. 4 is a schematic structural view of a first moving mechanism of the vertical rigid-flexible coupling multi-degree-of-freedom walking position-adjusting leg unit.
Figure 9:
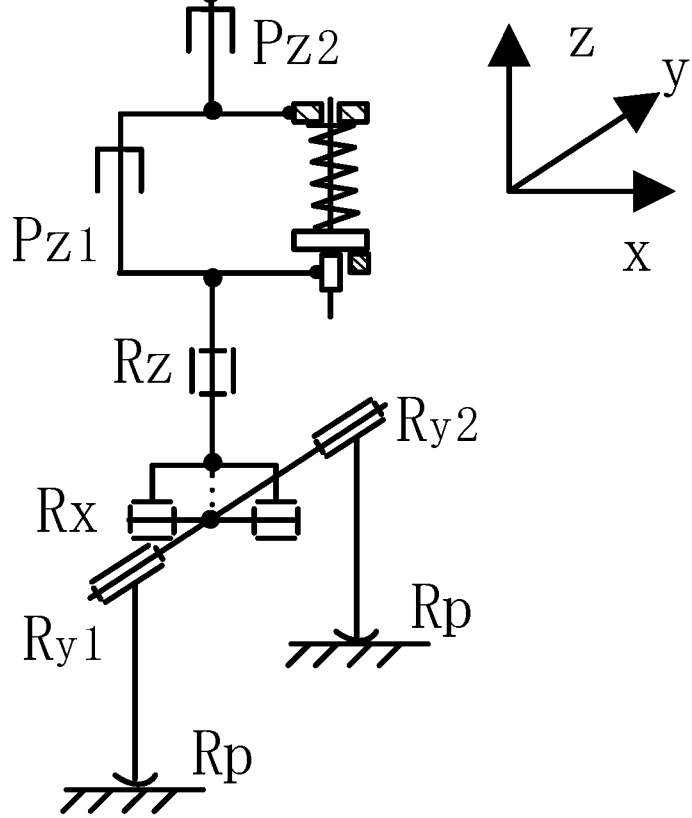
FIG. 9 is a structural principal view of a vertical rigid-flexible coupling multi-degree-of-freedom walking position-adjusting leg unit.

As shown in FIGS. 1, 2, 9, a vertical rigid-flexible coupling multi-degree-of-freedom walking position-adjusting leg unit includes two first moving devices 11, a first lifting frame 12, a first moving drive 13, two first moving mechanisms 14, a first steering drive 15, a steering frame 16, four first spring devices 17 and a first driving differential wheel set 18. The first moving device 11 includes a first vehicle body adapter 111, two second guide rails 112, four second sliding blocks 113, a second lead screw supporting seat 114, a second lead screw 115, a second nut 116, a second lead screw fixing seat 117, a second servo motor 118 and a second speed reducer 119. The two second guide rails 112 are fixedly mounted on two sides of the first vehicle body adapter 111. The two ones of the four second sliding blocks 113 are slidably mounted on each of the two second guide rails 112. The second lead screw 115 is rotatably mounted between the two second lead screws 115 through the second lead screw fixing seat 117 and the second lead screw supporting seat 114, and an axis of which is parallel to the second guide rail 112. The second nut 116 is spirally mounted on the second lead screw 115. The second servo motor 118 is fixedly mounted on a top of the first vehicle body adapter frame 111 through the second speed reducer 119, an output shaft of the second servo motor 118 is in key connection with an input hole of the second speed reducer 119, and an output hole of the second speed reducer 119 is in key connection with an input end of the second lead screw 115. The four second sliding blocks 113 and the second nuts 116 of the first moving device 11 are fixedly connected to the first lifting frame 12, and the two first moving devices 11 are symmetrically mounted on the front and rear sides of the first lifting frame 12 through the four second sliding blocks 113. Due to the decelerating transmission by synchronously driving the two second servo motors 118 to rotate through the two second speed reducers 119, the synchronous rotation of the second lead screw 115 is realized, and further the two second nuts 116 are synchronously moved along the two second lead screws 115, respectively, and the movement of the two first vehicle body adaptors 111 relative to the first lifting frame 12 can be achieved, so as to form a moving pair Pz2. Preferably, the second lead screw 115 is a sliding lead screw with a self-locking function.

As shown in FIGS. 1, 3, 4, and 9, the first moving drive 13 includes: a first servo motor 131, a worm gear speed reducer 132, a first clutch 133, a first speed reducer 134, a first synchronous shaft 135, a first high-level driving synchronous wheel 136, a first low-level driving synchronous wheel 137, a first motor mounting frame 138 and two first synchronous belts 139. The first servo motor 131 is fixedly mounted on the worm gear speed reducer 132, and an output shaft of which is in key connection with an input shaft of the worm gear speed reducer 132. The left end of the first clutch 133 is fixedly connected with the worm gear speed reducer 132, and the right end thereof is fixedly connected with the first speed reducer 134, and an input hole thereof is fixedly connected with an output shaft of the worm gear speed reducer 132, an output end thereof is fixedly connected with an input hole of the first speed reducer 134, and the first speed reducer 134 is fixedly mounted on the first steering frame 16 through the first motor mounting frame 138. The first synchronous shaft 135 is rotatably mounted on the first motor mounting frame 138. The first high-level driving synchronous wheel 136 and the first low-level driving synchronous wheel 137 are vertically distributed and fixedly mounted on the first synchronous shaft 135. An output shaft of the first speed reducer 134 is in key connection with the first synchronous shaft 135. When the first clutch 133 is tightly held, the rotation of the first high-level driving synchronous wheel 136 and the first low-level driving synchronous wheel 137 can be achieved by driving the first servo motor 131 and through the transmission of the worm gear speed reducer 132, the first clutch 133, the first speed reducer 134 and the first synchronous shaft 135. The first moving mechanism 14 includes a first driven synchronous wheel 141, a first lead screw fixing seat 142, a first lead screw 143, a first nut 144, a first lead screw supporting seat 145, two first guide rails 146 and four first sliding blocks 147, in which the two first guide rails 146 are in parallel and fixedly mounted on a side of the first steering frame 16, and the two ones of the four first sliding blocks 147 are mounted on each of the two first guide rails 146 in a sliding manner. The first lead screw 143 is mounted on the first steering frame 16 by the upward rotation of the first lead screw fixing seat 142 and the first lead screw supporting seat 145, and is positioned between the two first guide rails 146, and an axis of which is parallel to the first guide rails 146. The first nut 144 is mounted on the first lead screw 143 in a spiral manner. The first driven synchronous wheel 141 is fixedly mounted on the input end of the first lead screw 143. The four first sliding blocks 147 and the first nut 144 are fixedly mounted on the inner side of the first lifting frame 12. The two first moving mechanisms 14 are respectively and fixedly mounted on the left side and the right side of the first steering frame 16, and the two first moving mechanisms 14 have a height difference of a synchronous wheel. One of the two first synchronous belts 139 is used to realize the synchronous meshing connection between the first driven synchronous wheel 141 of the first moving mechanism 14 on the left side and the first low-level driving synchronous wheel 137, and the other thereof is used to realize the synchronous meshing connection between the first driven synchronous wheel 141 of the first moving mechanism 14 on the right side and the first high-level driving synchronous wheel 136. The synchronous rotation of the first high-level driving synchronous wheel 136 and the first low-level driving synchronous wheel 137 are driven by the first servo motor 131, through the transmission of the two first synchronous belts 139, the rotation of the first lead screws 143 is realized, and further the first lifting frames 12 are driven to move through the movement of the first nuts 144 along the lead screws, and finally the first lifting frames 12 move axially along the lead screws relative to the first steering frame, to form a moving pair Pz1.

Preferably, the first lead screw 143 is a ball lead screw, which has no self-locking function. The position self-locking of the moving pair Pz1 depends on braking of a worm speed reducer and a motor tail end in a series motion chain. Preferably, the moving pair Pz1 and the moving pair Pz2 are parallel to each other and symmetrically distributed on four sides two by two.

Figure 5:
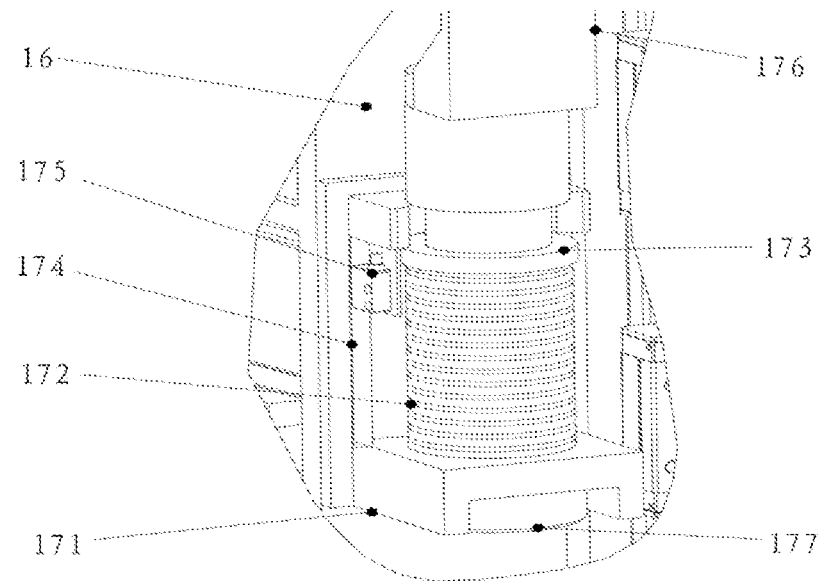
FIG. 5 is a schematic structural view of a first spring device of the vertical rigid-flexible coupling multi-degree-of-freedom walking position-adjusting leg unit.
Figure 6:
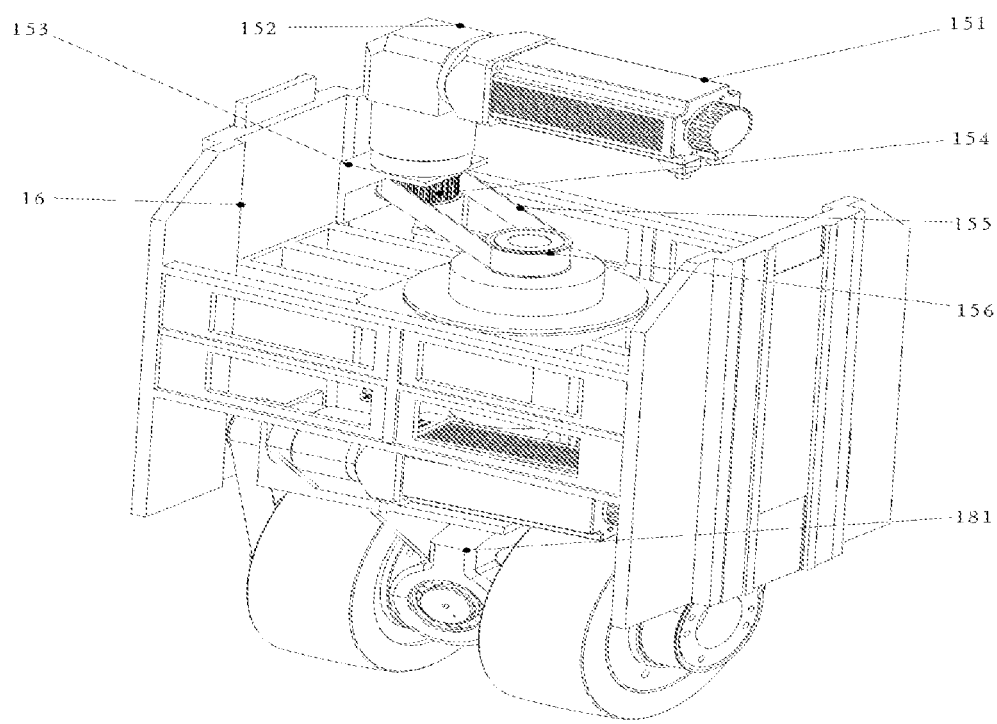
FIG. 6 is a schematic structural view of a first steering drive of the vertical rigid-flexible coupling multi-degree-of-freedom walking position-adjusting leg unit.
Figure 7:
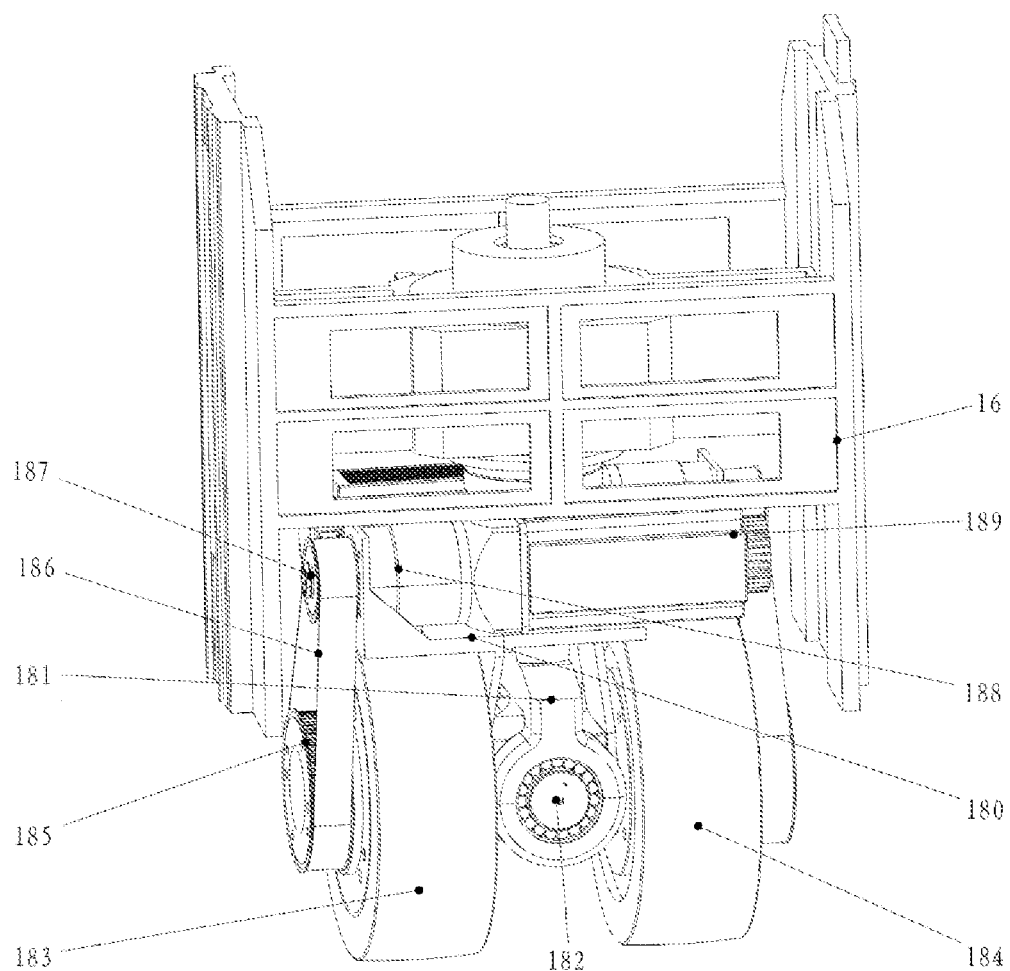
FIG. 7 is a schematic structural view of a first driving differential wheel set of the vertical rigid-flexible coupling multi-degree-of-freedom walking position-adjusting leg unit.
Figure 8:
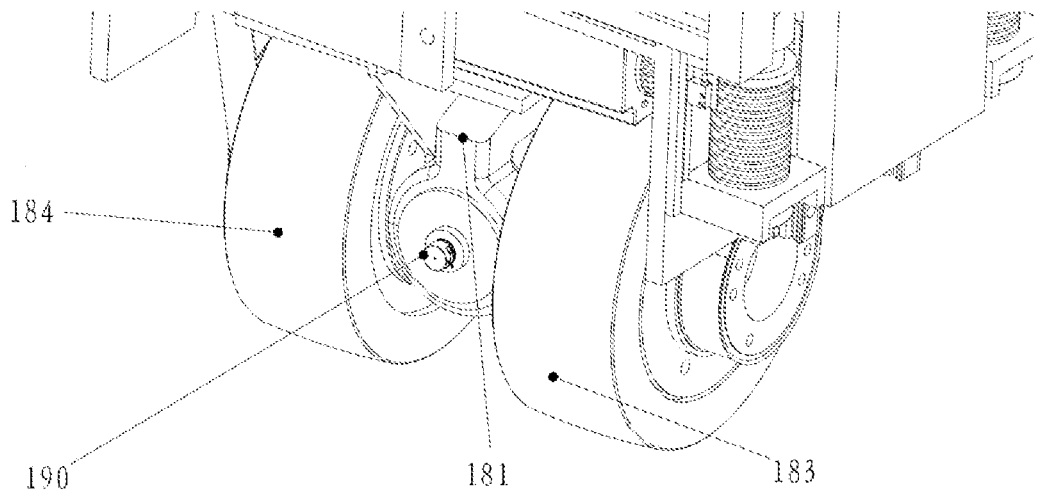
FIG. 8 is schematic structural view of a first driving differential wheel set of the vertical rigid-flexible coupling multi-degree-of-freedom walking position-adjusting leg unit viewed at another angle.

As shown in FIGS. 1, 5, and 9, the first spring device 17 includes a spring fixing frame 171, a spring 172, a spring sliding barrel 173, a magnetic scale 174, a magnetic head 175, a spring pressing block 176, and a spring guide pin 177. The spring guide pin 177 is upward fixedly mounted on the spring fixing frame 171. The spring 172 and the spring sliding barrel 173 are slidably mounted on the spring guide pin 177, and the spring 172 is mounted between the spring fixing frame 171 and the spring sliding barrel 173. The spring fixing frame 171 is provided with an upper limiting block, the spring sliding barrel 173 is in contact with the upper limiting block of the spring fixing frame 171 in a natural state or a state with partial pre-tension force of the spring 172, and the spring sliding barrel 173 is pressed downwardly to enable the spring 172 to be pressed along the spring guide pin 177. The magnetic head 175 is fixedly mounted on the spring sliding barrel 173. The magnetic scale 173 is fixedly mounted on one side of the spring fixing frame 171, a direction of which is consistent with a moving direction of the magnetic head 175. A displacement of the magnetic head 175 relative to the magnetic scale is a deformation amount of the spring 172. The four first spring devices 17 are symmetrically and fixedly mounted at four corners of the bottom of the outer side of the first steering frame 16 through a spring fixing frame 171. The spring pressing blocks 176 of the four first spring devices 17 are symmetrically and downwards fixedly mounted at four corners of the inner part of the first lifting frame 12, the lower part thereof is cylindrical, and an axis of the cylinder is coincident with an axis of the spring guide pin 177. When the spring pressing block 176 is driven by the first lifting frame 12 to contact the spring sliding barrel 173, the spring 172 is continuously pressed downwardly to be compressed, the compression amount can be measured through the magnetic head 175 and the magnetic scale 174, and an elastic modulus of the spring is known, and then a supporting force of the spring 172 on the first lifting frame 12 can be obtained.

Preferably, the moving pair Pz1 is connected in parallel with the spring, and the moving pair Pz2 is connected in series with the spring. When the moving pair Pz1 bears a load, it is used for the rigid position adjustment. When the spring bears the load, the clutch in the transmission chain of the moving pair Pz1 is separated into a passive follower for the elastic suspension system. On this basis, when the moving pair Pz2 is connected in series with the spring, the moving pair Pz2 moves to form a rigid-flexible hybrid position adjustment.

As shown in FIGS. 1, 6, 7, 8 and 9, the first steering drive 15 includes a first steering motor 151, a first steering speed reducer 152, a first steering motor mounting frame 153, a steering driving synchronous wheel 154, a steering synchronous belt 155 and a steering driven synchronous wheel 156. The first steering motor 151 is fixedly mounted on the first steering speed reducer 152. The first steering speed reducer 152 is fixedly mounted inside the first steering frame 16 through the first steering motor mounting frame 153. An output shaft of the first steering motor 151 is in key connection with an input hole of the first steering speed reducer 152. The steering driving synchronous wheel 154 is fixedly connected with an output shaft of the first steering speed reducer 152. The steering driven synchronous wheel 156 is fixedly mounted at the top end of the vertical shaft 181 of the first driving differential wheel set 18. The steering synchronous belt 155 is synchronously meshed between the steering driving synchronous wheel 154 and the steering driven synchronous wheel 156. The vertical shaft 181 penetrates through the first steering frame and forms a rotating pair Rz. The first driving differential wheel set 18 includes two wheel-rotation motor mounting frame 180, a vertical shaft 181, a cross shaft 182, a left wheel 183, a right wheel 184, two wheel-rotation driven synchronous wheel 185, two wheel-rotation synchronous belt 186, two wheel-rotation driving synchronous wheel 187, two wheel-rotation speed reducer 188, two wheel-rotation motor 189 and an angle encoder 190. The first driving differential wheel set 18 is rotatably mounted at a bottom center of the first steering frame 16 through the vertical shaft 181, is driven by the first steering motor 151 to rotate the steering driving synchronous wheel 154 via speed reduction transmission of the first steering speed reducer 152, and rotates around an axis of the vertical shaft 181 via the synchronous transmission of the steering synchronous belt 155 and the steering driven synchronous wheel 156, to form a rotating pair Rz. The transverse shaft of the cross shaft 182 is rotatably connected with the bottom of the vertical shaft 181 to form a rotating pair Rx, and one angle encoder is mounted at an end of the Rx shaft. The left wheel 183 and the right wheel 184 are rotatably mounted at the left end and the right end of a longitudinal axis of the cross shaft 182 respectively to form a rotating pair Ry1 and a rotating pair Ry2, and the two wheels are in contact with the ground to form a wheel-rotation pair Rp. The wheel-rotation motor 189 is fixedly mounted on the wheel-rotation speed reducer 188, the wheel-rotation speed reducer 188 is fixedly mounted above the cross shaft 181 through the wheel-rotation motor mounting frame 180, the wheel-rotation driving synchronous wheel 187 is fixedly mounted on an output shaft of the wheel-rotation speed reducer 188. The two wheel-rotation driven synchronous wheels 185 are respectively and fixedly mounted outside the left wheel 183 and the right wheel 184. The wheel-rotation synchronous belt 186 is synchronously meshed between the wheel-rotation driving synchronous wheel 187 and the wheel-rotation driven synchronous wheel 185, which is driven by a wheel-rotation motor 189 through the transmission of the wheel-rotation reducer 188, the wheel-rotation driving synchronous wheel 187, the wheel-rotation synchronous wheel 186 and the wheel-rotation driven synchronous wheel 185, such that the rotation of the wheels around the longitudinal axis of the cross shaft 182 can be realized. The two wheels rotate synchronously to realize walking, and rotate asynchronously to realize steering and mutually correct with the driving of the first steering motor 151.

As shown in FIG. 9, the axis of the moving pair Pz2 is parallel to the axis of the moving pair Pz1, parallel to the axis of the rotating pair Rz, and parallel to the axis of the first spring device 17, the moving pair Pz1 is parallel to the spring 172, and the moving pair Pz2 is connected in series with the spring 172; the axis of the rotating pair Rx is vertical to the axis of the rotating pair Rz, and is also vertical to the axes of the rotating pair Ry1 and the rotating pair Ry2; the axes of the rotating pair Ry1 and the rotating pair Ry2 are coaxial.

Figure 10:
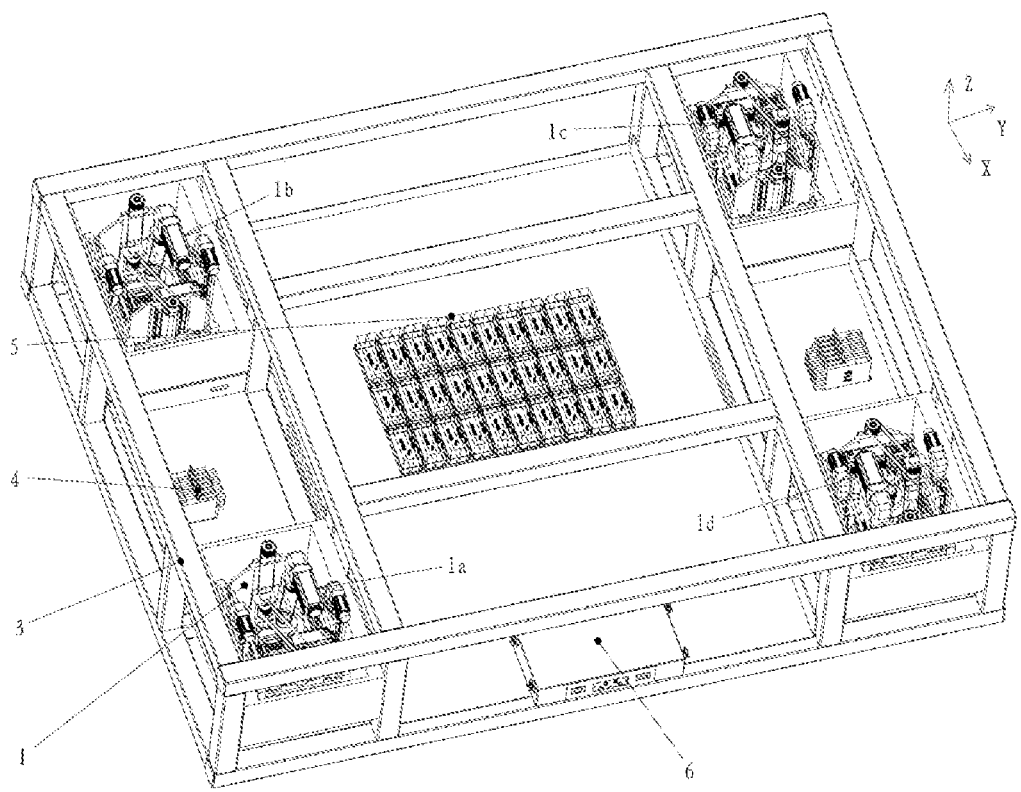
FIG. 10 is a schematic structural view of a hybrid robot platform with the vertical rigid-flexible coupling multi-degree-of-freedom walking position-adjusting leg unit.

As shown in FIGS. 1, 9 and 10, a hybrid robot platform with the vertical rigid-flexible coupling multi-degree-of-freedom walking position-adjusting leg unit includes four vertical rigid-flexible coupling multi-degree-of-freedom walking position-adjusting leg units 1, a frame 3, two driver sets 4, a battery pack 5 and a control box 6. The four vertical rigid-flexible coupling multi-degree-of-freedom walking position-adjusting leg units 1 are fixedly mounted at four corners of the frame 3 through first vehicle body adapters 111 and are respectively a first position-adjusting leg unit 1*a*, a second position-adjusting leg unit 1*b*, a third position-adjusting leg unit 1*c* and a fourth position-adjusting leg unit 1*d*. The 2 driver sets 4 are respectively fixed on the left side and the right side of the frame 3. The battery pack 5 is fixedly mounted in the middle of the frame 3. The control box 6 is fixedly mounted outwardly on the front side of the middle of the frame 3. The moving pair Pz1, the moving pair Pz2 and the rotating pair Rz of each of the vertical rigid-flexible coupling multi-freedom-degree walking position-adjusting leg unit 1 are parallel to each other and perpendicular to the plane of the frame.

Particularly, the hybrid robot platform with the vertical rigid-flexible coupling multi-degree-of-freedom walking position-adjusting leg units is not limited to a four-leg parallel mechanism platform, also includes three, four, six and eight same vertical rigid-flexible coupling multi-degree-of-freedom walking position-adjusting leg units, and is symmetrically distributed on the edge of the frame. The global space intelligent walking of the whole plant and the six degree-of-freedom position adjustment can be realized.

The principle of the hybrid robot platform with the vertical rigid-flexible coupling multi-degree-of-freedom walking position-adjusting leg units is as follows: eight wheel-rotation motors 189 of the four vertical rigid-flexible coupling multi-degree-of-freedom walking position-adjusting leg units are driven to synchronously rotate in a reverse direction, the cross shaft 182 of the first driving differential wheel set 18 rotates around the axis thereof, after the axis of the transverse shaft of the cross shaft 182 rotates to a X direction, the two wheel-rotation motors 189 of the two or more position-adjusting units are synchronously driven to rotate in the same direction, and thereby realizing the movement of the position-adjusting platform along the X direction; similarly, after the axis of the cross shaft 182 is rotated to a Y direction, the two wheel-rotation motors 189 of the two or more position-adjusting units are synchronously driven to rotate in the same direction, and thereby realizing the movement of the position-adjusting platform along the Y direction. The eight wheel-rotation motors 189 of the four vertical rigid-flexible coupling multi-degree-of-freedom walking position-adjusting leg units are driven to synchronously rotate in the reverse direction, the cross shaft 182 of the first driving differential wheel set 18 rotates around the axis thereof, after projection lines of the axes of the longitudinal shafts of the four cross shafts 182 of the four position-adjusting units on a plane are intersected with a projection point of a Z axis on the plane, and then the rotating speeds of the eight wheel-rotation motors 189 are coordinated, so that the position-adjusting platform can rotate around the Z axis in a whole circle. First servo motors 131 or second servo motors 118 of the four position-adjusting units are synchronously driven such that the four first vehicle body adaptors 111 are synchronously lifted, and thus the position-adjusting platform moves along the normal direction or Z direction thereof. The first servo motor 131 or the second servo motor 118 of the first position-adjusting leg unit 1*a* and the second position-adjusting leg unit 1*b* are synchronously driven such that the first vehicle body adapters 111 of the first position-adjusting leg unit 1*a* and the second position-adjusting leg unit 1*b* are lifted. The first servo motor 131 or the second servo motor 118 of the third position-adjusting leg unit 1*c* and the fourth position-adjusting leg unit 1*d* are synchronously driven such that the first vehicle body adapters 111 of the third position-adjusting leg unit 1*c* and the fourth position-adjusting leg unit 1*d* are dropped, and thus the position-adjusting platform can rotate clockwise around the X axis, on the contrary, the position-adjusting platform can rotate anticlockwise around the X axis. Similarly, the first servo motor 131 or the second servo motor 118 of the first position-adjusting leg unit 1*a* and the fourth position-adjusting leg unit 1*d* are synchronously driven such that the first vehicle body adapters 111 of the first position-adjusting leg unit 1*a* and the fourth position-adjusting leg unit 1*d* are lifted, and the first servo motor 131 or the second servo motor 118 of the second position-adjusting leg unit 1*b* and the third position-adjusting leg unit 1*c* are synchronously driven such that the first vehicle body adapters 111 of the second position-adjusting leg unit 1*b* and the third position-adjusting leg unit 1*c* are dropped, and thus the position-adjusting platform can rotate clockwise around the Y axis, on the contrary, the position-adjusting platform can rotate anticlockwise around the Y axis.

Figure 11:
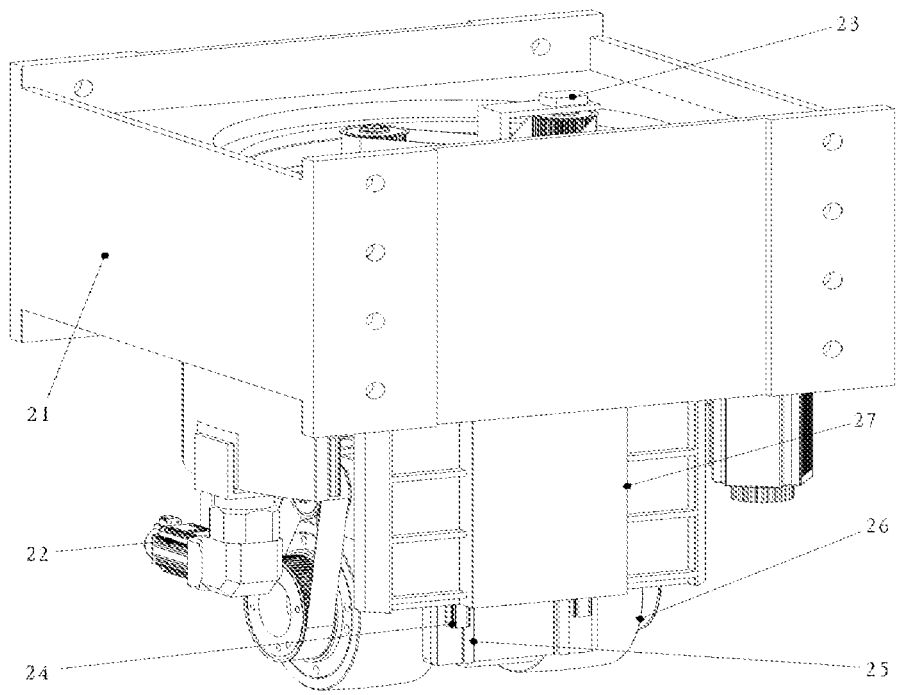
FIG. 11 is a schematic structural view of a horizontal rigid-flexible coupling multi-degree-of-freedom walking position-adjusting leg unit.

As shown in FIG. 11, a horizontal rigid-flexible coupling multi-degree-of-freedom walking position-adjusting leg unit includes a steering device 21, two second moving devices 22, a third moving drive 23, two second moving mechanisms 24, a second steering frame 25, a second driving differential wheel set 26, a second lifting frame 27 and four second spring devices 28.

Figure 12:
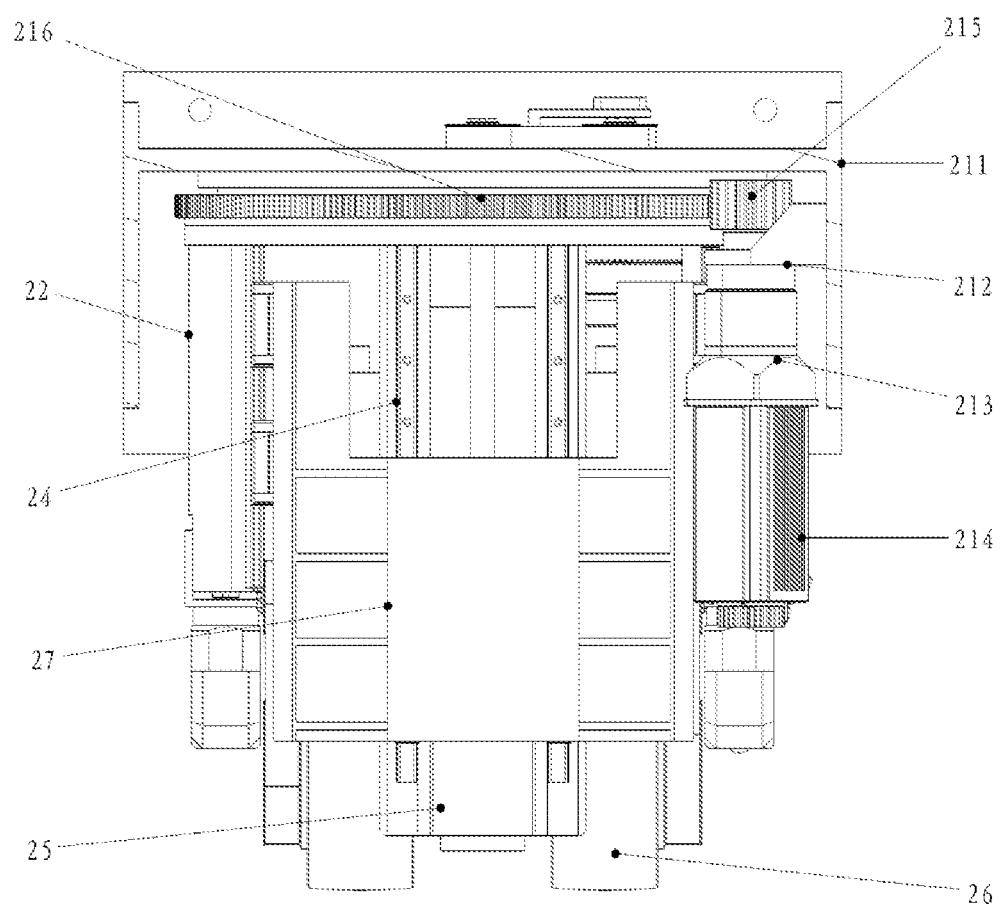
FIG. 12 is a schematic structural sectional view of a horizontal rigid-flexible coupling multi-degree-of-freedom walking position-adjusting leg unit.
Figure 17:
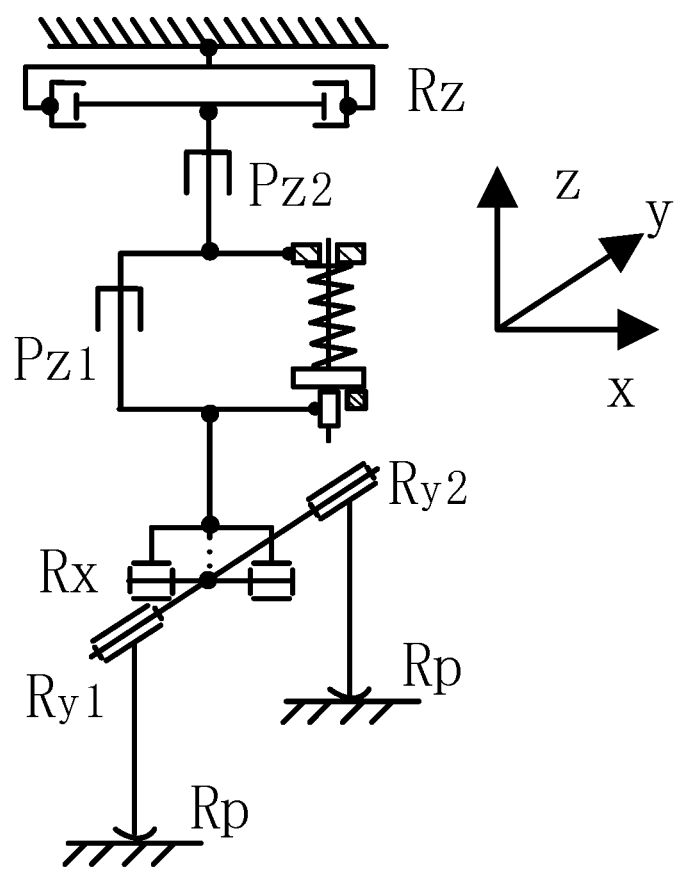
FIG. 17 is a structural principal view of a horizontal rigid-flexible coupling multi-degree-of-freedom walking position-adjusting leg unit.

As shown in FIGS. 11, 12 and 17, the steering device 21 includes a second vehicle body adapter 211, a second steering motor mounting frame 212, a second steering speed reducer 213, a second steering motor 214, a pinion 215 and a gear turntable bearing 216. The gear turntable bearing 216 is fixedly mounted at the bottom of the second vehicle body adapter 211 through an inner ring thereof, an outer ring thereof is processed with a ring of external teeth (i.e., the gear). The second steering motor 214 is fixedly mounted on the second steering speed reducer 213. The second steering speed reducer 213 is fixedly mounted on an inner wall of the second vehicle body adapter 211 through the second steering motor mounting frame 212. The pinion 215 is fixedly mounted on an output shaft of the second steering speed reducer 213, and the pinion 215 is engaged with the external teeth of the gear turntable bearing 216 for rotation. Due to the driving of the second steering motor 214 and the transmission of the second steering speed reducer 213, the pinion is transmitted and the gear turntable bearing rotates around the axis thereof, such that the whole leg rotates around the vertical axis, that is, a rotating pair Rz is formed.

Figure 13:
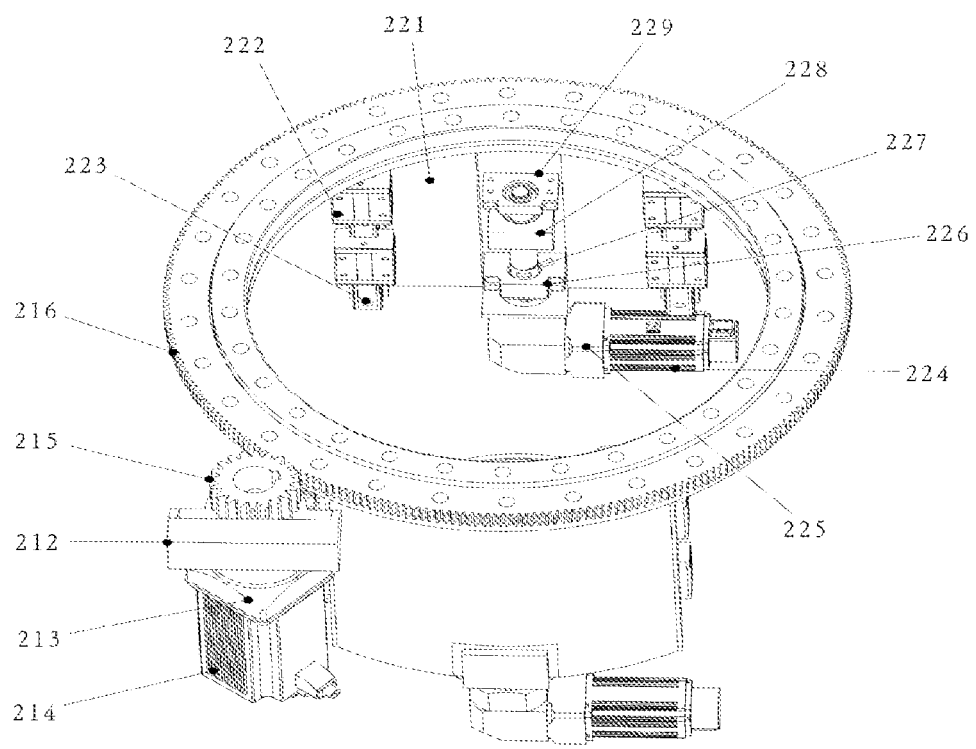
FIG. 13 is a schematic structural view of a second moving device of the horizontal rigid-flexible coupling multi-degree-of-freedom walking position-adjusting leg unit.

As shown in FIGS. 11, 13, and 17, the second moving device 22 includes a turntable adapter 221, four fourth sliding blocks 222, two fourth guide rails 223, a fourth servo motor 224, a fourth speed reducer 225, a fourth lead screw fixing seat 226, a fourth lead screw 227, a fourth nut 228, and a fourth lead screw supporting seat 229. The turntable adapter 221 is fixedly mounted below the outer ring of the gear turntable bearing 216. The two ones of the four fourth sliding blocks 222 are slidably mounted on one side inside the turntable adapter 221 through the two fourth guide rails 223. The fourth lead screw 227 is mounted on one side inside the turntable adapter 221 through downward rotation of the fourth lead screw fixing seat 226 and a fourth lead screw supporting seat 229, and is located between the two fourth guide rails 223, and the axis thereof is parallel to a mounting direction of the guide rails. The fourth nut 228 is spirally mounted on the fourth lead screw 227, and moves along the axis of the lead screw by the rotation of the lead screw. The fourth servo motor 224 is fixedly mounted on the fourth speed reducer 225. The fourth speed reducer 225 is upwardly and fixedly mounted at the bottom of the turntable adapter 221, and an output shaft thereof is fixedly connected with an input shaft of the fourth lead screw 227. The four fourth sliding blocks 222 and the fourth nuts 228 are fixedly mounted outside the second lifting frame 27. The two second moving devices 22 are respectively arranged on two sides inside the turntable adapter, and are synchronously driven by the two fourth servo motors 224, and are synchronously transmitted by the fourth speed reducers 225, the two fourth lead screws 227 and the fourth nuts 228, so that the second lifting frame 27 moves along the axis of the fourth lead screw 227 to form a moving pair Pz2. Preferably, the fourth lead screw 227 is a sliding lead screw with a self-locking function. Preferably, the axis of rotating pair Rz is parallel to the moving guide rail of moving pair Pz2, which both are connected in series.

Figure 14:
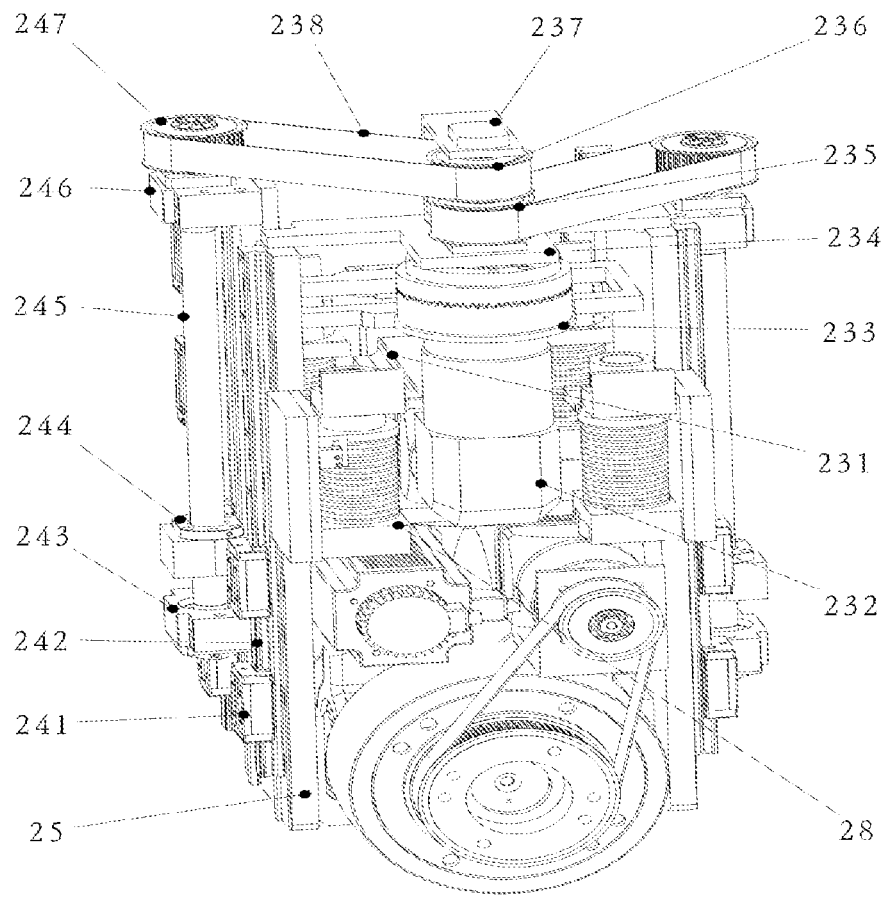
FIG. 14 is a schematic structural view of a third moving drive and a second moving mechanism of the horizontal rigid-flexible coupling multi-degree-of-freedom walking position-adjusting leg unit.

As shown in FIGS. 11, 14 and 17, the third moving drive 23 includes a third servo motor 231, a third worm speed reducer 232, a third clutch 233, a third motor mounting frame 234, a third low-level driving synchronous wheel 235, a third high-level driving synchronous wheel 236, a third synchronous shaft 237 and two third synchronous belts 238. The second moving mechanism 24 includes four third sliding blocks 241, two third guide rails 242, a third lead screw supporting seat 243, a third nut 244, a third lead screw 245, a third lead screw fixing seat 246 and a third driven synchronous wheel 247. The third servo motor 231 is fixedly mounted on the third worm speed reducer 232. The third worm speed reducer 232 is upwardly and fixedly mounted at the bottom of the third clutch 233, the input end thereof is in key connection with the output end of the third servo motor 231, and the output end thereof is in key connection with the input end of the third clutch 233. The top of the third clutch 233 is fixedly mounted in the middle of the second steering frame 25 through a third motor mounting frame 234, and the output end thereof is in key connection with the third synchronous shaft 237. The third synchronous shaft 237 rotates downwardly and is mounted on the third motor mounting frame 234. The third high-level driving synchronous wheel 236 and the third low-level driving synchronous wheel 235 are fixedly mounted at the high position and the low position of the third synchronous shaft 237, respectively. The two third guide rails 242 are fixedly mounted in parallel on a side of the second steering frame 25. The two ones of the four third sliding blocks 241 are slidably mounted on the two third guide rails 242 in pair. The third lead screw 245 is mounted on the second steering frame 25 by the upward rotation of the third lead screw fixing seat 246 and the third lead screw supporting seat 243, and is located between the two third guide rails 242, and an axis thereof is parallel to the third guide rails 242. The third nut 244 is spirally mounted on the third lead screw 245. The third driven synchronous wheel 247 is fixedly mounted at the input end of the third lead screw 245. The four third sliding blocks 241 and the third nuts 244 are fixedly mounted inside the second lifting frame 27. The two second moving mechanisms 24 are respectively and fixedly mounted at the left side and the right side of the second steering frame 25, and have a height difference of a synchronous wheel. One of the two third synchronous belts 238 is synchronously engaged between the third driven synchronous wheel 247 of the second moving mechanism 24 and the third low-level driving synchronous wheel 235, and the other one thereof is synchronously engaged between the third driven synchronous wheel 247 of the second moving mechanism 24 and the third high-level driving synchronous wheel 236. The synchronous rotation of the third high-level driving synchronous wheel 236 and the third low-level driving synchronous wheel 235 can be realized by the driving of the third servo motor 231, the rotation of the two third lead screws 245 can be realized through the transmission of the two third synchronous belts 238, and furthermore the third nut 244 moves along the lead screw to drive the movement of the second lifting frame 27, and finally the second lifting frame 27 moves axially along the lead screws relative to the first steering frame, to form a moving pair Pz1.

Preferably, the third lead screw 245 is a ball lead screw without a self-locking function. The position of the moving pair Pz1 is locked by the braking of the third worm speed reducer 232 and the tail end of the third servo motor 231 together. Preferably, the axis of the rotating pair Rz is parallel to the moving guide rails of the moving pair Pz2 and the moving pair Pz1, which three are connected in series.

Figure 15:
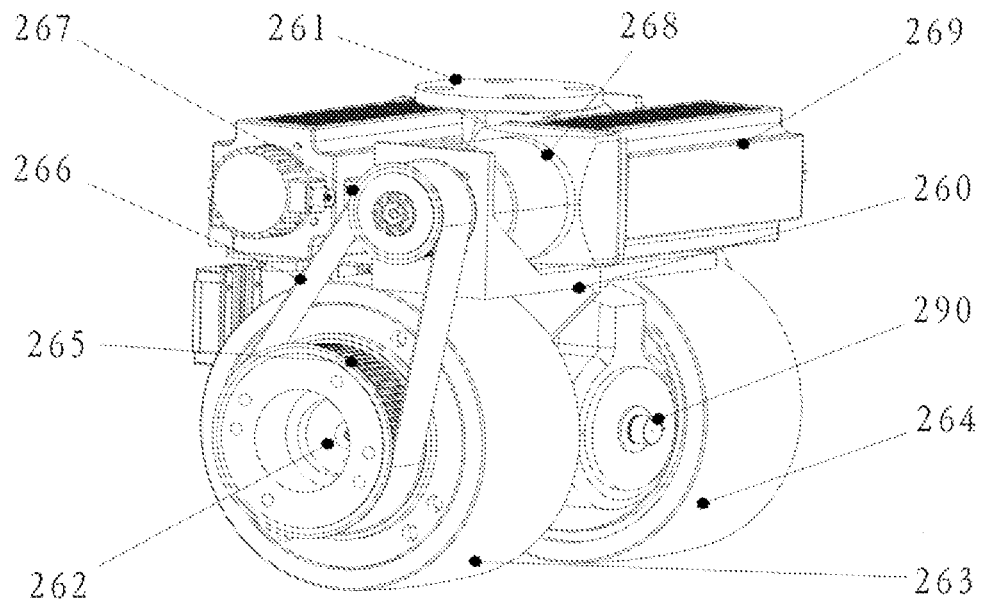
FIG. 15 is a schematic structural view of a second driving differential wheel set of the horizontal rigid-flexible coupling multi-degree-of-freedom walking position-adjusting leg unit.

As shown in FIGS. 11, 15, and 17, the second driving differential wheel set 26 includes two second wheel-rotation motor-mounting frames 260, a second vertical shaft 261, a second cross-shaft 262, a second left wheel 263, a second right wheel 264, two second wheel-rotation driven synchronous wheels 265, two second wheel-rotation synchronous belts 266, two second wheel-rotation driving synchronous wheels 267, two second wheel-rotation speed reducers 268, two second wheel-rotation motors 269, and a second angle encoder 290. The second driving differential wheel set 26 is fixedly mounted at the bottom center of the second steering frame 25 via a second vertical shaft 261. The transverse shaft of the second cross shaft 262 is rotatably connected to the bottom of the second vertical shaft 261 to form a rotating pair Rx, and a second angle encoder 290 is mounted at an end of the Rx shaft. The second left wheel 263 and the second right wheel 264 are respectively and rotatably mounted at the left end and the right end of the longitudinal axis of the second cross shaft 262 to form a rotating pair Ry1 and a rotating pair Ry2, and the two wheels are in contact with the ground to form a wheel-rotation pair Rp. The second wheel-rotation motor 269 is fixedly mounted on the second wheel-rotation speed reducer 268. The second wheel-rotation speed reducer 268 is fixedly mounted above the second cross shaft 262 through the mounting frame 260 of the second wheel-rotation motor 269. the second wheel-rotation driving synchronous wheel 267 is fixedly mounted on an output shaft of the second wheel-rotation speed reducer 268. The two second wheel-rotation driven synchronous wheels 265 are fixedly mounted on outside the second left wheel 263 and the second right wheel 264, respectively. The second wheel-rotation synchronous belt 266 is synchronously meshed between the second wheel-rotation driving synchronous wheel 267 and the second wheel-rotation driven synchronous wheel 265. Due to the driving of the second wheel-rotation motor 269 and through the transmission of the second wheel-rotation reducer 268, the second wheel-rotation driving synchronous wheel 267, the second wheel-rotation synchronous belt 266 and the second wheel-rotation driven synchronous wheel 265, the wheels rotate around the longitudinal axis of the second cross shaft 262. The two wheels rotate synchronously to realize walking, and rotate asynchronously to realize steering and correct with the second steering motor drive 214.

Preferably, the axis of the rotating pair Rz is parallel to the moving pair Pz1 and the moving pair Pz2, perpendicular to the rotating pair Rx, and is coaxial with the rotating pair Ry1 and the rotating pair Ry2.

Figure 16:
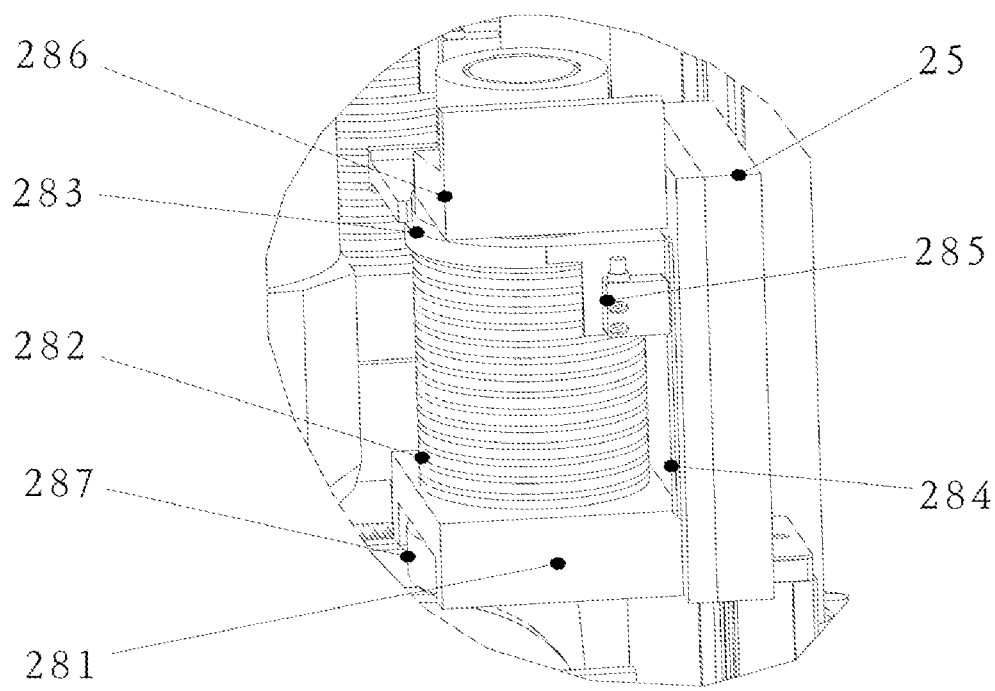
FIG. 16 is a schematic structural view of a second spring device of the horizontal rigid-flexible coupling multi-degree-of-freedom walking position-adjusting leg unit.

As shown in FIGS. 11, 16 and 17, the second spring device 28 includes a second spring fixing frame 281, a second spring 282, a second spring sliding barrel 283, a second magnetic scale 284, a second magnetic head 285, a second spring pressing block 286 and a second spring guide pin 287. The second spring guide pin 287 is upwardly and fixedly mounted on the second spring fixing frame 281. The second spring 282 and the second spring sliding barrel 283 are slidably mounted on the second spring guide pin 287. The second spring 282 is mounted between the second spring fixing frame 281 and the second spring sliding barrel 283. The second spring fixing frame 281 is provided with an upper limiting block, the second spring sliding barrel 283 is in contact with the upper limiting block of the second spring fixing frame 281 in a natural state or a state with partial pre-tension force of the second spring 282, and the second spring sliding barrel 283 is pressed downwardly to enable the second spring 282 to be pressed along the second spring guide pin 287. The second magnetic head 285 is fixedly mounted on the second spring sliding barrel 283. The second magnetic scale 284 is fixedly mounted on one side of the second spring fixing frame 281, a direction of which is consistent with a moving direction of the second magnetic head 285. A displacement of the second magnetic head 285 relative to the second magnetic scale 284 is a deformation amount of the second spring 282. The two ones of the four second spring devices 28 in pair are symmetrically and fixedly mounted in the middle of the inside of the second steering frame 25 through the second spring fixing frame 281. The two ones of the second spring pressing blocks 286 of the four second spring devices 28 are symmetrically and fixedly mounted on the inside of the second lifting frame, and the lower part of which is cylindrical, and an axis of the cylinder is coincident with an axis of the second spring guide pin 287, when the second spring pressing block 286 is driven by the second lifting frame 27 to contact with the second spring sliding barrel 283, the second spring 282 is continuously pressed downwardly to be compressed, and a value of a supporting force of the second spring 282 on the second lifting frame 27 can be obtained through the second magnetic scale 284.

Preferably, the second spring device 28 is connected in parallel with the moving pair Pz1, when the moving pair Pz1 bears a load, the spring 172 is in a non-working state, and the legs are in a rigid position-adjusting state; when the spring 172 bears the load, the clutch in the transmission system of the moving pair Pz1 is opened and is in a passive following state, and the legs are in a flexible suspension state. The second spring device 17 is connected in series with the moving pair Pz2, and in a suspension state, the moving pair Pz2 is driven to play a rigid-flexible coupling position-adjusting function.

As shown in FIG. 17, the axis of the rotating pair Rz is parallel to the axis of the moving pair Pz2, the axis of the moving pair Pz1 and the axis of the second spring device 28; the axis of the rotating pair Rx is perpendicular to the axis of the rotating pair Rz, is perpendicular to the axes of the rotating pair Ry1 and rotating pair Ry2, and is coaxial with the axial directions of the rotating pair Ry1 and rotating pair Ry2.

Figure 18:
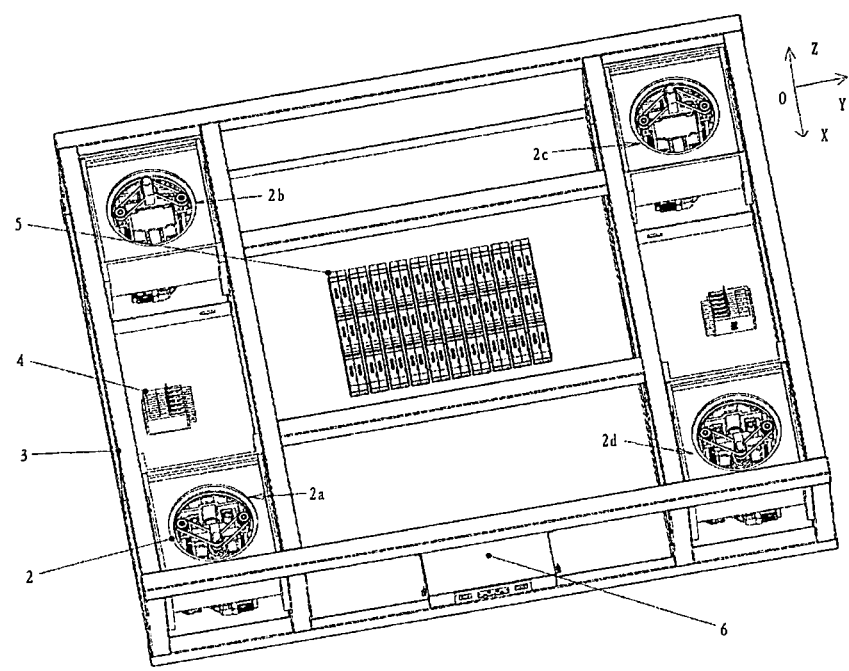
FIG. 18 is a schematic structural view of a hybrid robot platform with the horizontal rigid-flexible coupling multi-degree-of-freedom walking position-adjusting leg unit.

As shown in FIGS. 11, 17 and 18, the hybrid robot platform with a horizontal rigid-flexible coupling multi-degree-of-freedom walking position-adjusting leg unit includes four horizontal rigid-flexible coupling multi-degree-of-freedom walking position-adjusting leg units 2, a frame 3, two driver sets 4, a battery pack 5 and a control box 6. The four horizontal rigid-flexible coupling multi-degree-of-freedom walking position-adjusting leg units 2 are fixedly mounted at four corners of the frame 3 through the second vehicle body adapters 211, and are respectively a third position-adjusting leg unit 2a, a fourth position-adjusting leg unit 2b, a fifth position-adjusting leg unit 2c and a sixth position-adjusting leg unit 2d. The two driver sets 4 are respectively fixed on the left side and the right side of the frame 3. The battery pack 5 is fixedly mounted in the middle of the frame 3. The control box 6 is outwardly and fixedly mounted on the front side in the middle of the frame 3. The axes of the rotating pairs Rz of the horizontal rigid-flexible coupling multi-freedom-degree walking position-adjusting leg units are parallel to each other and perpendicular to the plane of the frame 3. The position adjustment of 6 degrees of freedom of the whole vehicle space is realized by driving the moving pair Pz1, the moving pair Pz2, the rotating pair Rz, the rotating pair Ry1 and the rotating pair Ry2 of the four horizontal rigid-flexible coupling multi-degree-of-freedom walking position-adjusting leg units 2.

Particularly, the hybrid robot platform with the horizontal rigid-flexible coupling multi-degree-of-freedom walking position-adjusting leg unit is not limited to a four-leg parallel mechanism, and can also include three, four, six or eight-leg parallel mechanism platforms which are symmetrically distributed on the edge of the frame 3.

The principle of the hybrid robot platform with the horizontal rigid-flexible coupling multi-degree-of-freedom walking position-adjusting leg units is as follows: eight wheel-rotation motors 189 of the four horizontal rigid-flexible coupling multi-degree-of-freedom walking position-adjusting leg units are driven to synchronously rotate in a reverse direction, the cross shaft 182 of the second driving differential wheel set 26 rotates around the axis thereof, after the axis of the transverse shaft of the cross shaft 182 rotates to a X direction, the two wheel-rotation motors 189 of the two or more position-adjusting units are synchronously driven to rotate in the same direction, and thereby realizing the movement of the position-adjusting platform along the X direction; similarly, after the axis of the cross shaft 182 is rotated to a Y direction, the two wheel-rotation motors 189 of the two or more position-adjusting units are synchronously driven to rotate in the same direction, and thereby realizing the movement of the position-adjusting platform along the Y direction. The eight wheel-rotation motors 189 of the four horizontal rigid-flexible coupling multi-degree-of-freedom walking position-adjusting leg units are driven to synchronously rotate in the reverse direction, the cross shaft 182 of the second driving differential wheel set 26 rotates around the axis thereof, after projection lines of the axes of the longitudinal shafts of the four cross shafts 182 of the four position-adjusting units on a plane are intersected with a projection point of a Z axis on the plane, and then the rotating speeds of the eight wheel-rotation motors 189 are coordinated, so that the position-adjusting platform can rotate around the Z axis in a whole circle. Third servo motors 231 or fourth servo motors 224 of the four position-adjusting units are synchronously driven such that the four second vehicle body adaptors 211 are synchronously lifted, and thus the position-adjusting platform moves along the normal direction or Z direction thereof. The third servo motor 231 or the fourth servo motor 224 of the fifth position-adjusting leg unit 2a and the sixth position-adjusting leg unit 2b are synchronously driven such that the second vehicle body adapters 211 of the fifth position-adjusting leg unit 2a and the sixth position-adjusting leg unit 2b are lifted. The third servo motor 231 or the fourth servo motor 224 of the third position-adjusting leg unit 1c and the eighth position-adjusting leg unit 2d are synchronously driven such that the second vehicle body adapters 211 of the seventh position-adjusting leg unit 2c and the eighth position-adjusting leg unit 2d are dropped, and thus the position-adjusting platform can rotate clockwise around the X axis, on the contrary, the position-adjusting platform can rotate anticlockwise around the X axis. Similarly, the third servo motor 231 or the fourth servo motor 224 of the fifth position-adjusting leg unit 2a and the eighth position-adjusting leg unit 2d are synchronously driven such that the second vehicle body adapters 211 of the fifth position-adjusting leg unit 2a and the eighth position-adjusting leg unit 2d are lifted, and the third servo motor 231 or the fourth servo motor 224 of the sixth position-adjusting leg unit 2b and the seventh position-adjusting leg unit 2c are synchronously driven such that the second vehicle body adapters 211 of the sixth position-adjusting leg unit 2b and the seventh position-adjusting leg unit 2c are dropped, and thus the position-adjusting platform can rotate clockwise around the Y axis, on the contrary, the position-adjusting platform can rotate anticlockwise around the Y axis.

The above-mentioned embodiments are only used to illustrate the technical solution of the present disclosure, rather than limit the present disclosure. Although the present disclosure has been described in detail with reference to the foregoing embodiments, it should be understood by the person skilled in the art that it is allowable to modify the technical solution described in the foregoing embodiments or equivalently substituting some or all of the technical features; however, these modifications or substitutions do not cause the corresponding technical solutions to substantively depart from the scope of the technical solutions of various embodiments of the present disclosure.

What is claimed is:

1. A vertical rigid-flexible coupling multi-degree-of-freedom walking position-adjusting leg unit, comprises two first moving devices, a first lifting frame, a first moving drive, two first moving mechanisms, a first steering drive, a first steering frame, four first spring devices and a first driving differential wheel set, wherein, the first moving drive comprises a first servo motor, a worm gear speed reducer, a first clutch, a first speed reducer, a first synchronous shaft, a first high-level driving synchronous wheel, a first low-level driving synchronous wheel, a first steering motor mounting frame and a first synchronous belt, in which the first servo motor is connected with a left end of the first clutch by the worm gear speed reducer, and a right end of the first clutch is fixedly connected to the first speed reducer; the first speed reducer is fixedly connected to a first steering frame by the first steering motor mounting frame; the first synchronous shaft is rotatably mounted on the first steering motor mounting frame; the first high-level driving synchronous wheel and the first low-level driving synchronous wheel are respectively connected with the first synchronous shaft; and an output shaft of the first speed reducer is in key connection with the first synchronous shaft;

each of the first moving mechanisms comprises a first driven synchronous wheel, a first lead screw fixing seat, a first lead screw, a first nut, a first lead screw supporting seat, a first guide rail and a first sliding block, in which the first guide rail is fixedly connected to the first steering frame; the first sliding block and the first guide rail form a moving pair Pz1; two ends of the first lead screw are respectively supported by the first lead screw fixing seat and the first lead screw supporting seat, an axis of the first lead screw is parallel to the first guide rail; the first nut and the first lead screw form a screw pair; the first driven synchronous wheel is fixedly connected to an input end of the first lead screw, and the first driven synchronous wheel is synchronously meshed and connected with the first high-level driving synchronous wheel and the first low-level driving synchronous wheel through the first synchronous belt;

the two first moving devices are symmetrically arranged on two sides of the first lifting frame by second sliding blocks; the first moving drive is fixed in a middle of the first steering frame by the first steering motor mounting frame; first sliding blocks and first nuts of the two first moving mechanisms in set are mounted on an inner side of the first lifting frame, and the two first moving mechanisms are respectively fixedly connected to two sides of the first steering frame with a height difference; the four first spring devices are symmetrically and fixedly connected to four corners on a bottom of an outer side of the first steering frame by spring fixing frames; and spring pressing blocks of the four first spring devices are symmetrically and fixedly connected to four corners of an inside of the first lifting frame; the first steering drive is fixedly connected to an inner side of the first steering frame by the first steering motor mounting frame; a steering driven synchronous wheel of the first steering drive is fixedly connected to a top end of a vertical shaft of the first driving differential wheel set that is rotatably mounted at a center on a bottom of the first steering frame by a vertical shaft;

each of the two first moving devices comprises a first vehicle body adapter, a second guide rail, a second sliding block, a second lead screw supporting seat, a second lead screw, a second nut, a second lead screw fixing seat, a second servo motor and a second speed reducer, in which the second guide rail is respectively and fixedly connected to two sides of the first vehicle body adapter; the second sliding block and the second guide rail form a moving pair Pz2; two ends of the second lead screw are supported by the second lead screw fixing seat and the second lead screw supporting seat respectively, an axis of the second lead screw is parallel to the second guide rail; the second nut and the second lead screw form a screw pair, and the second servo motor is connected with the second lead screw by a second speed reducer;

the first steering drive comprises a first steering motor, a first steering speed reducer, a first steering motor mounting frame, a steering driving synchronous wheel, a steering synchronous belt and the steering driven synchronous wheel, in which the first steering motor mounting frame is fixedly connected to the inner side of the first steering frame; the first steering motor is connected with the steering driving synchronous wheel through the first steering speed reducer; the steering driving synchronous wheel is connected with the steering driven synchronous wheel through the steering synchronous belt; the steering driven synchronous wheel is fixedly connected with the vertical shaft; and the vertical shaft is connected with the first steering frame to form a rotating pair Rz;

the first driving differential wheel set comprises a wheel-rotation motor mounting frame, a vertical shaft, a cross shaft, a left wheel, a right wheel, a wheel-rotation driven synchronous wheel, a wheel-rotation synchronous belt, a wheel-rotation driving synchronous wheel, a wheel-rotation speed reducer, a wheel-rotation motor and an angle encoder, in which a transverse shaft of the cross shaft is rotatably connected with a bottom of the vertical shaft to form a rotating pair Rx; a side of the vertical shaft is provided with the angle encoder; the left wheel and the right wheel are respectively connected with a left end and a right end of a longitudinal shaft of the cross shaft to form a rotating pair Ry1 and a rotating pair Ry2; two wheels are in contact with the ground to form a wheel-rotation pair Rp; the wheel-rotation motor is fixedly connected to the wheel-rotation speed reducer; the wheel-rotation speed reducer is fixedly connected above the cross shaft through the wheel-rotation motor mounting frame; the wheel-rotation driving synchronous wheel is fixedly connected to an output shaft of the wheel-rotation speed reducer; the wheel-rotation driven synchronous wheel is fixedly connected to outer sides of the left wheel and the right wheel; and the wheel-rotation driving synchronous wheel is connected with the wheel-rotation driven synchronous wheel through the wheel-rotation synchronous belt; and each of the four first spring devices comprises a spring fixing frame, a spring, a spring sliding barrel, a magnetic scale, a magnetic head, a spring pressing block and a spring guide pin, in which the spring guide pin is fixedly connected with the spring fixing frame; the spring and the spring sliding barrel are slidably mounted on the spring guide pin; the spring is mounted between the spring fixing frame and the spring sliding barrel; the spring fixing frame is provided with an upper limiting block; the magnetic head is fixedly connected to the spring sliding barrel; the magnetic scale is fixedly connected to a side of the spring fixing frame, and a direction of which is consistent with a moving direction of the magnetic head.

2. The vertical rigid-flexible coupling multi-degree-of-freedom walking position-adjusting leg unit according to claim 1, wherein an axis of the moving pair Pz2 is parallel to an axis of the moving pair Pz1, an axis of the rotating pair Rz and an axis of the first spring device; an axis of the rotating pair Rx is perpendicular to an axis of the rotating pair Rz, an axis of the rotating pair Ry1 and an axis of the rotating pair Ry2; the axis of the rotating pair Ry1 is coincident with the axis of the rotating pair Ry2; and the moving pair Pz1 is connected in parallel with the first spring device, and the moving pair Pz2 is connected in series with the first spring device.

3. The vertical rigid-flexible coupling multi-degree-of-freedom walking position-adjusting leg unit according to claim 1, wherein the first lead screw is a ball lead screw without a self-locking function, and the second lead screw is a sliding lead screw with a self-locking function.

4. A hybrid robot platform comprising the vertical rigid-flexible coupling multi-degree-of-freedom walking position-adjusting leg unit according to claim 1, comprising a frame, a driver set, a battery pack and a control box, wherein the vertical rigid-flexible coupling multi-degree-of-freedom walking position-adjusting leg unit is symmetrically distributed at an edge of the frame and is connected through a first vehicle body adapter; the axes of the rotating pairs Rz of the vertical rigid-flexible coupling multi-degree-of-freedom walking position-adjusting leg units are parallel to one another and perpendicular to a plane of the frame; and the driver set, the battery pack and the control box are fixed inside the frame.

5. The hybrid robot platform according to claim 4, wherein the frame and a plurality of vertical rigid-flexible coupling multi-degree-of-freedom walking position-adjusting leg units form a parallel mechanism platform, and the parallel mechanism platform is capable of including three, four, six or eight vertical rigid-flexible coupling multi-degree-of-freedom walking position-adjusting leg units.

6. Horizontal rigid-flexible coupling multi-degree-of-freedom walking position-adjusting leg unit comprises a steering device, two second moving devices, a third moving drive, a second moving mechanism, a second steering frame, a second driving differential wheel set, a second lifting frame and four second spring devices, wherein the two second moving devices are connected with a gear turntable bearing in the steering device through a turntable adapter; and the third moving drive is fixedly connected to a middle of the second steering frame through a third motor mounting frame; a third guide rail in the second moving mechanism is connected with the second steering frame; a third sliding block in the second moving mechanism is connected with an inner side surface of the second lifting frame, and the two second moving mechanisms are provided with a height difference; the second driving differential wheel set is connected with a bottom of the second steering frame through a second vertical shaft; the four second spring devices are symmetrically and fixedly connected to the middle of an inner side of the second steering frame through second spring fixing frames, and the four second spring devices are symmetrically and fixedly connected to the inner side of the second lifting frame through second spring pressing blocks;

the steering device comprises a second vehicle body adapter, a second steering motor mounting frame, a second steering speed reducer, a second steering motor, a pinion and a gear turntable bearing, in which an upper surface of an inner ring of the gear turntable bearing is connected with the second vehicle body adapter; the second steering motor is connected with the pinion through the second steering speed reducer, and the pinion is externally engaged with the gear turntable bearing to form a rotating pair Rz;

the third moving drive comprises a third servo motor, a third worm speed reducer, a third clutch, a third motor mounting frame, a third low-level driving synchronous wheel, a third high-level driving synchronous wheel, a third synchronous shaft and a third synchronous belt, in which the third servo motor is connected with the third synchronous shaft through the third worm speed reducer and the third clutch; the third clutch is fixedly connected to the middle of the second steering frame through the third motor mounting frame; the third synchronous shaft is rotatably connected with the third motor mounting frame; and the third high-level driving synchronous wheel and the third low-level driving synchronous wheel are respectively and fixedly connected to a high level and a low level of the third synchronous shaft;

the second moving mechanism comprises a third sliding block, a third guide rail, a third lead screw supporting seat, a third nut, a third lead screw fixing seat and a third driven synchronous wheel, in which the third guide rail is parallel to and fixedly connected to the second steering frame; the third sliding block and the third guide rail form a moving pair Pz1; the third lead screw is supported by the third lead screw fixing seat and the third lead screw supporting seat, and an axis of the third lead screw is parallel to the third guide rail; the third driven synchronous wheel is fixedly connected to an input end of the third lead screw; and the third lead screw is in spiral connection with the third nut;

each of the second moving devices comprises a turntable adapter, a fourth sliding block, a fourth guide rail, a fourth servo motor, a fourth speed reducer, a fourth lead screw fixing seat, a fourth lead screw, a fourth nut and a fourth lead screw supporting seat, in which the fourth sliding block and the fourth guide rail form a moving pair Pz2; the fourth guide rail is fixed inside the turntable adapter; the fourth lead screw is supported by the fourth lead screw fixing seat and the fourth lead screw supporting seat, and an axis of the fourth lead screw is parallel to the fourth guide rail; the fourth servo motor is connected with the fourth lead screw through a fourth speed reducer, and the fourth lead screw is in spiral connection with a fourth nut;

the third low-level driving synchronous wheel is connected with a third driven synchronous wheel on the lower side through a third synchronous belt; and the third high-level driving synchronous wheel is connected with a third driven synchronous wheel on the upper side through a third synchronous belt;

the second driving differential wheel set comprises a second wheel-rotation motor mounting frame, a second vertical shaft, a second crossed shaft, a second left wheel, a second right wheel, a second wheel-rotation driven synchronous wheel, a second wheel-rotation synchronous belt, a second wheel-rotation driving synchronous wheel, a second wheel-rotation speed reducer, a second wheel-rotation motor and a second angle encoder, in which a transverse shaft of the second crossed shaft is rotatably connected with a bottom of the second vertical shaft to form a rotating pair Rx, and an end face of the transverse shaft is provided with the second angle encoder; the second left wheel and the second right wheel are respectively and rotatably mounted at a left end and a right end of a longitudinal axis of the second crossed shaft to form a rotating pair Ry1 and a rotating pair Ry2; and two wheels are in contact with the ground to form a wheel-rotation pair Rp; the second wheel-rotation driven synchronous wheel is fixedly connected to outer sides of a second left wheel and a second right wheel respectively; the second wheel-rotation driven synchronous wheel is connected with the second wheel-rotation driving synchronous wheel through the second wheel-rotation synchronous belt; and the second wheel-rotation driving synchronous wheel is connected with a second wheel-rotation motor through the second wheel-rotation speed reducer;

each of the four second spring devices comprises a second spring fixing frame, a second spring sliding barrel, a second magnetic scale, a second magnetic head, a second spring pressing block and a second spring guide pin, in which a top of the second spring guide pin is connected with the second spring fixing frame, and the second spring fixing frame is provided with an upper limiting block; the second spring and the second spring sliding barrel are slidably mounted on the second spring guide pin, and the second spring is mounted between the second spring fixing frame and the second spring sliding barrel; the second magnetic head is fixedly connected to the second spring sliding barrel; the second magnetic scale is fixedly connected to a side of the second spring fixing frame, and a direction of which is consistent with a moving direction of the second magnetic head.

7. The horizontal rigid-flexible coupling multi-degree-of-freedom walking position-adjusting leg unit according to claim 6, wherein an axis of the rotating pair Rz, an axis of the moving pair Pz2, an axis of the moving pair Pz1 and an axis of the second spring device are parallel to one another; an axis of the rotating pair Rx is perpendicular to the axis of the rotating pair Rz, and also is perpendicular to an axis of the rotating pair Ry1 and an axis of the rotating pair Ry2; and the axis of the rotating pair Ry1 is coincident with the axis of the rotating pair Ry2.

8. The horizontal rigid-flexible coupling multi-degree-of-freedom walking position-adjusting leg unit according to claim 7, wherein the fourth lead screw is a sliding lead screw with a self-locking function, and the third lead screw is a ball lead screw without a self-locking function.

\* \* \* \* \*